US012619876B2

(12) United States Patent
Kanwar et al.

(10) Patent No.: US 12,619,876 B2
(45) Date of Patent: May 5, 2026

(54) FLEXIBLE ENTITY RESOLUTION NETWORKS

(71) Applicant: Reltio, Inc., Redwood Shores, CA (US)

(72) Inventors: Anshuman Kanwar, Cambridge, MA (US); Robin Sylvester, San Francisco, CA (US)

(73) Assignee: Reltio, Inc., Redwood Shores, CA (US)

( * ) Notice: Subject to any disclaimer, the term of this patent is extended or adjusted under 35 U.S.C. 154(b) by 0 days.

(21) Appl. No.: 19/056,627

(22) Filed: Feb. 18, 2025

(65) Prior Publication Data

US 2025/0265460 A1     Aug. 21, 2025

Related U.S. Application Data

(60) Provisional application No. 63/569,725, filed on Mar. 25, 2024, provisional application No. 63/554,146, filed on Feb. 15, 2024.

(51) Int. Cl.
*G06N 3/08* (2023.01)
(52) U.S. Cl.
CPC ..................................... *G06N 3/08* (2013.01)
(58) Field of Classification Search
CPC ...................................................... G06N 3/08
See application file for complete search history.

(56) References Cited

U.S. PATENT DOCUMENTS 11,321,615 B1    5/2022  Genkin
11,514,321 B1 *  11/2022  Chen ......................... G06N 3/08
(Continued)

OTHER PUBLICATIONS

Li et al. ("A Survey on Deep Learning for Named Entity Recognition", vol. 34, No. 1, Jan. 2022) (Year: 2022).*

(Continued)

*Primary Examiner* — Imad Kassim
(74) *Attorney, Agent, or Firm* — AHMANN KLOKE LLP

(57) ABSTRACT

Among other techniques, techniques for machine learning-based entity resolution are described. An example method includes receiving an entity resolution request, the entity resolution request indicating a first entity and a second entity; identifying a plurality of first attributes in a data model; identifying a plurality of second attributes in the data model; creating a first string based on the plurality of first attributes of the data model; creating a second string based on the plurality of second attributes of the data model; generating a first prompt based on the first string; generating a second prompt based on the second string; providing the first prompt to a domain-agnostic large language model; generating, by the domain-agnostic large language model using the first prompt, a first domain-agnostic large language model result; clipping the first domain-agnostic large language model result; providing the second prompt to the domain-agnostic large language model; generating, by the domain-agnostic large language model using the second prompt, a second domain-agnostic large language model result; clipping the second domain-agnostic large language model result; generating, by a downstream neural network classifier, a machine learning final result based on the clipped first and second domain-agnostic large language model result; and merging, based on the machine learning final result, the first entity and the second entity.

17 Claims, 23 Drawing Sheets

(56) References Cited

U.S. PATENT DOCUMENTS

| | | | | |
|---|---|---|---|---|
| 12,093,300 | B1* | 9/2024 | Zhou | G06F 40/186 |
| 2014/0173042 | A1* | 6/2014 | Newton | H04L 67/1078 |
| | | | | 709/219 |
| 2021/0118442 | A1* | 4/2021 | Poddar | G06N 3/082 |
| 2021/0365817 | A1 | 11/2021 | Riegel | |
| 2022/0044279 | A1* | 2/2022 | Brown | G06Q 30/0264 |
| 2022/0092028 | A1* | 3/2022 | Layton | G06F 16/122 |
| 2022/0253725 | A1 | 8/2022 | Feng | |
| 2023/0087667 | A1* | 3/2023 | Dash | G06N 3/08 |
| | | | | 706/20 |
| 2023/0222290 | A1 | 7/2023 | Sen | |
| 2024/0370709 | A1* | 11/2024 | Siebel | G06N 3/047 |
| 2025/0165774 | A1* | 5/2025 | Magoon | G06N 20/00 |

OTHER PUBLICATIONS

International Search Report and Written Opinion for International Application No. PCT/US2025/01637 dated May 19, 2025.
International Search Report and Written Opinion for International Application No. PCT/US2025/016371 dated May 19, 2025.

* cited by examiner

Platform 102

L3 Customer Accessible Layer 302

L2 Industry-Focused Layer 304

L1 Industry-Agnostic Layer 306

FIG. 3

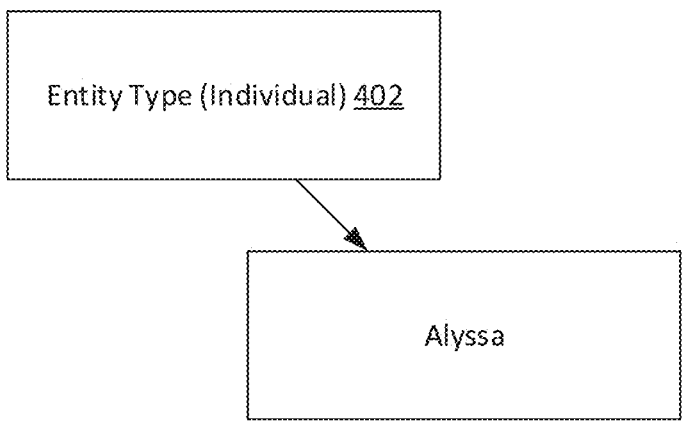
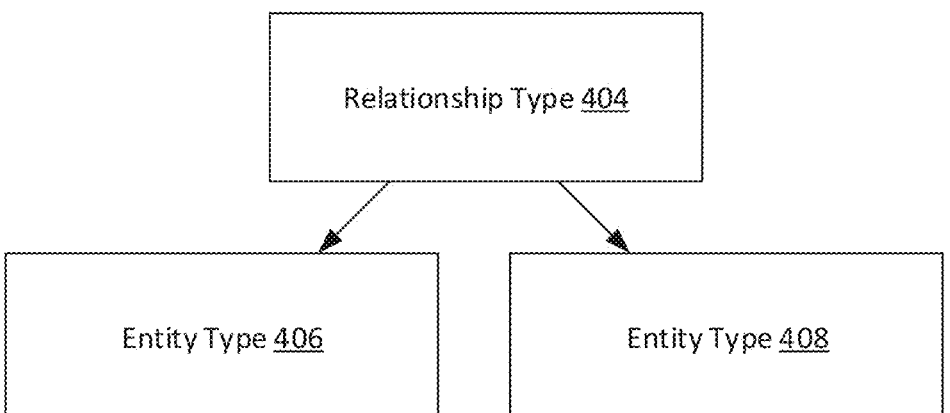
Interaction 410 (Event)
FIG. 4

FIG. 9

AI-based Matching System 2002

Parsing Engine
2004

ML Matching
Engine
2006

Clipping Engine
2008

ML Token Phrase
Analysis Engine
2010

ML Match
Analysis Engine
2012

ML Match
Performance
Recommendation
Engine 2014

ML Matching
Configuration and
Tuning Engine
2016

AI Match Merging
Engine
2018

AI-based
Matching System
Interface Engine
2020

AI-based Matching System
Datastore 2030

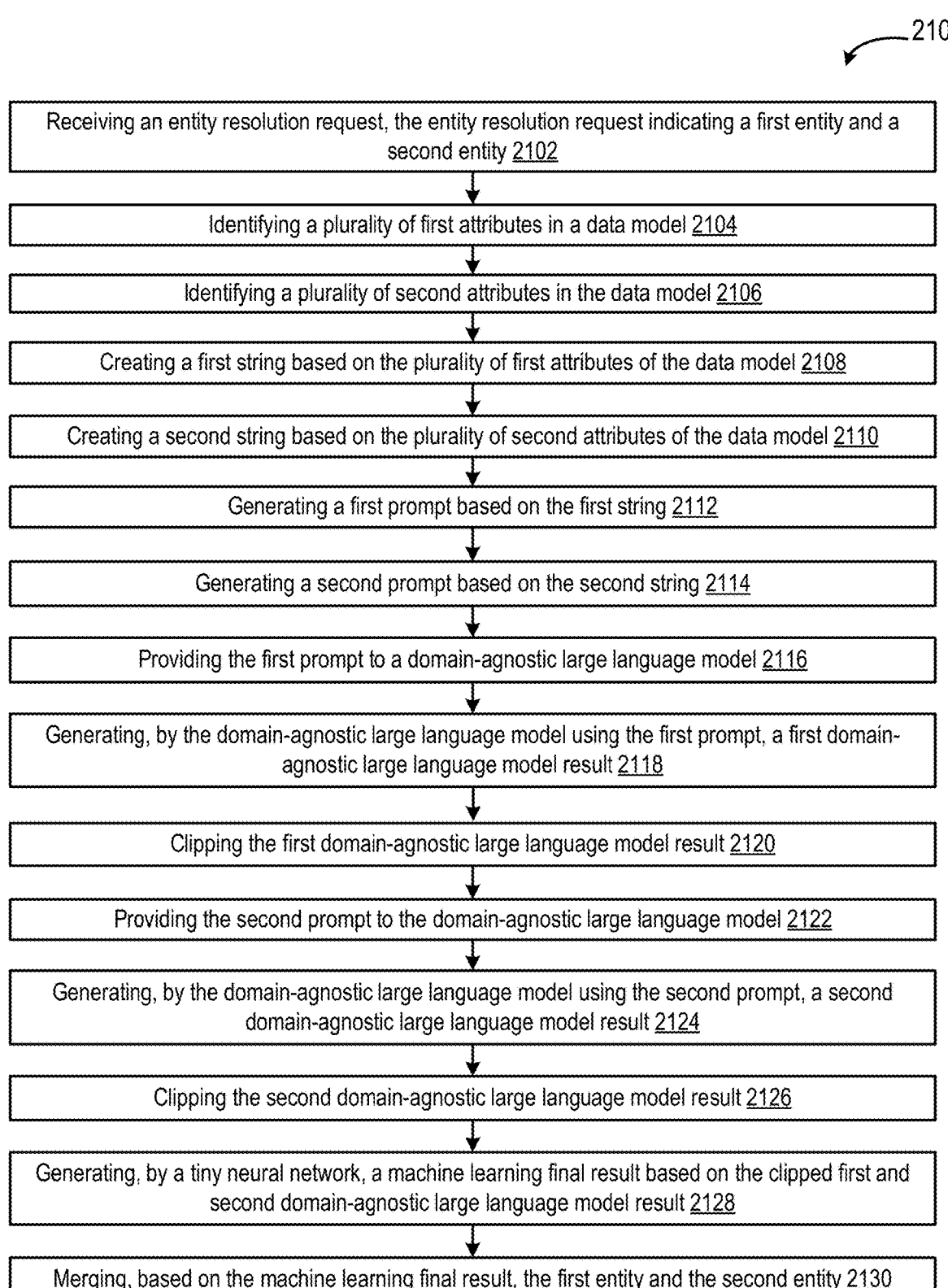

2100

Receiving an entity resolution request, the entity resolution request indicating a first entity and a second entity 2102

Identifying a plurality of first attributes in a data model 2104

Identifying a plurality of second attributes in the data model 2106

Creating a first string based on the plurality of first attributes of the data model 2108

Creating a second string based on the plurality of second attributes of the data model 2110

Generating a first prompt based on the first string 2112

Generating a second prompt based on the second string 2114

Providing the first prompt to a domain-agnostic large language model 2116

Generating, by the domain-agnostic large language model using the first prompt, a first domain-agnostic large language model result 2118

Clipping the first domain-agnostic large language model result 2120

Providing the second prompt to the domain-agnostic large language model 2122

Generating, by the domain-agnostic large language model using the second prompt, a second domain-agnostic large language model result 2124

Clipping the second domain-agnostic large language model result 2126

Generating, by a tiny neural network, a machine learning final result based on the clipped first and second domain-agnostic large language model result 2128

Merging, based on the machine learning final result, the first entity and the second entity 2130

FIG. 21

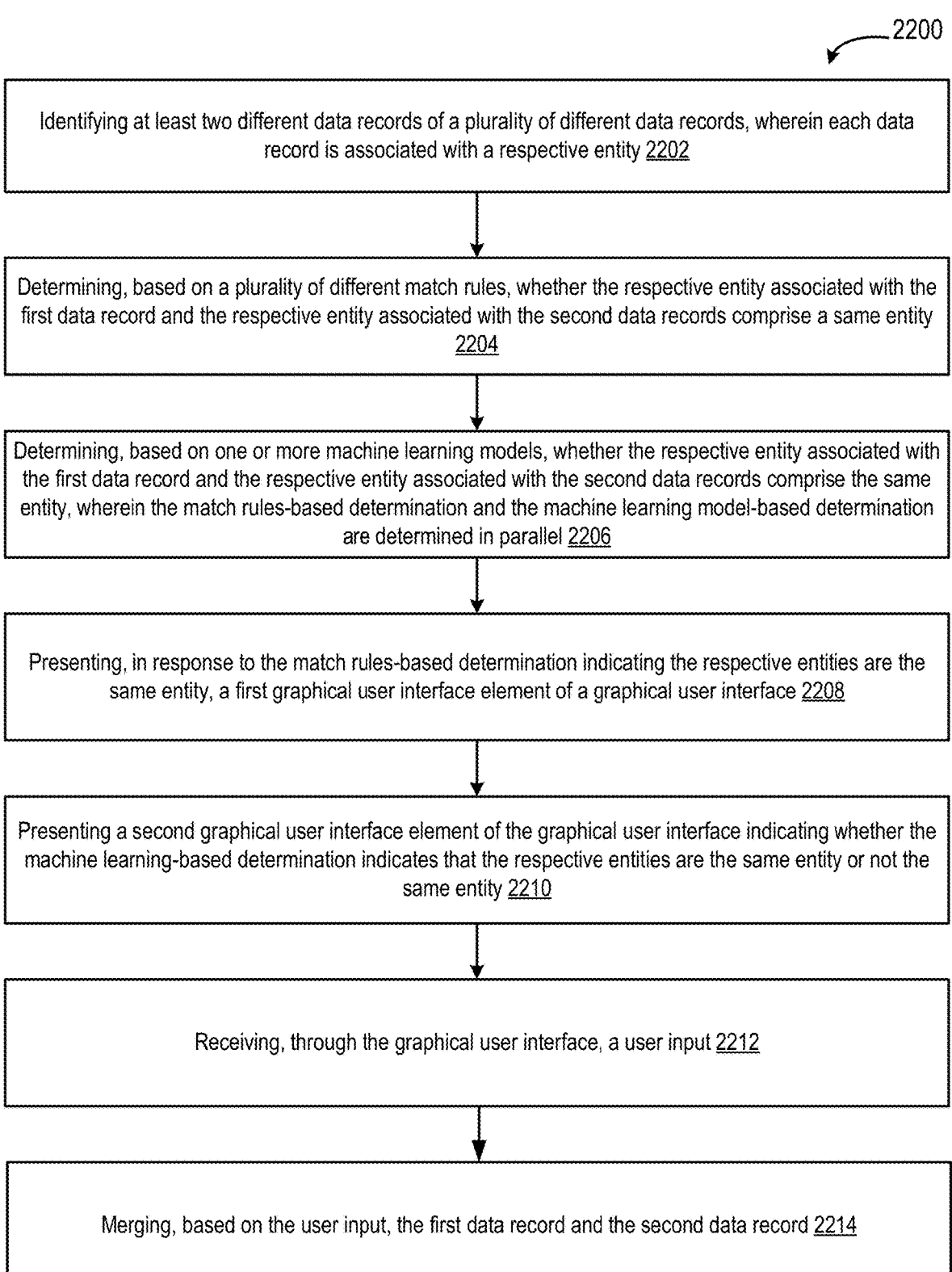

2200

Identifying at least two different data records of a plurality of different data records, wherein each data record is associated with a respective entity 2202

Determining, based on a plurality of different match rules, whether the respective entity associated with the first data record and the respective entity associated with the second data records comprise a same entity 2204

Determining, based on one or more machine learning models, whether the respective entity associated with the first data record and the respective entity associated with the second data records comprise the same entity, wherein the match rules-based determination and the machine learning model-based determination are determined in parallel 2206

Presenting, in response to the match rules-based determination indicating the respective entities are the same entity, a first graphical user interface element of a graphical user interface 2208

Presenting a second graphical user interface element of the graphical user interface indicating whether the machine learning-based determination indicates that the respective entities are the same entity or not the same entity 2210

Receiving, through the graphical user interface, a user input 2212

Merging, based on the user input, the first data record and the second data record 2214

FIG. 22

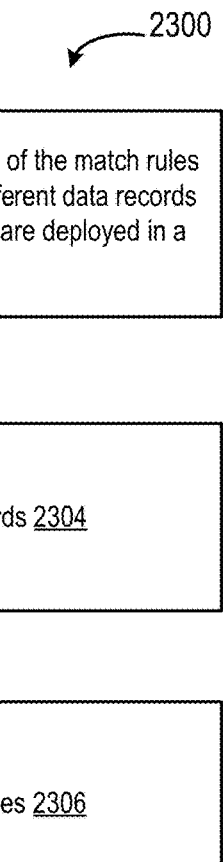

2300

Identifying one or more match rules of a plurality of different match rules, wherein each of the match rules are configured to identify whether at least two different data records of a plurality of different data records are each associated with a same entity, wherein the plurality of different data records are deployed in a production environment 2302

Executing the one or more match rules on the plurality of different data records 2304

Determining a respective performance for each of the one or more match rules 2306

Generating, based on one or more machine learning models and the respective performances of the one or more match rules, a match rule recommendation action 2308

Executing the match rule recommendation action 2310

FIG. 23

FLEXIBLE ENTITY RESOLUTION NETWORKS

CROSS-REFERENCE TO RELATED APPLICATIONS

The present application claims priority to U.S. Provisional Patent Application Ser. No. 63/554,146 filed Feb. 15, 2024 and U.S. Provisional Patent Application Ser. No. 63/569,725 filed Mar. 25, 2024, each of which is incorporated herein by reference.

BACKGROUND

Computing systems routinely store and process large amounts of disparate data. Processing such large amounts of data consumes vast amounts of computing resources (e.g., memory, processing speed, network bandwidth, and the like). Computing systems are also typically very inefficient and waste a lot of computing resources when processing such large amounts of data. For example, the data may include different data records for the same entity (e.g., multiple data records for the same employee of an organization), causing the computing system to process many more data records than necessary, which can lead to increased computing requirements (e.g., memory, storage, processors, network bandwidth) and reduced computational speed and efficiency, among other technical problems.

BRIEF DESCRIPTION OF THE DRAWINGS

FIG. 3 depicts a three-layer model in some embodiments.
FIG. 4 depicts a box diagram of some examples of entity type, relationship type, and event metadata.
FIG. 9 depicts an additional details tab in the data change request review pane.
FIG. 21 depicts a flowchart of an example method of AI-based flexible entity resolution.
FIG. 22 depicts a flowchart of an example method of interactive parallelized multimodal matching.
FIG. 23 depicts a flowchart of an example method of analyzing match rules and generating machine learning-based match rule recommendation actions.

DETAILED DESCRIPTION

Figure 1:
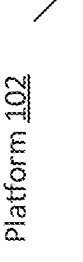
FIG. 1 depicts a connected data platform.

A claimed solution rooted in computer technology overcomes problems specifically arising in the realm of computer technology. In various embodiments, a computing system is configured to provide a multi-stage cascade of large language models and stage N neural networks that identifies matching data records within a set of data records, and then merges the matching data records. More specifically, the computing system can use a combination of domain-agnostic large language models and downstream neural network classifiers to identify matching data records that would otherwise not be possible with other machine learning or rules-based entity resolution systems. In one example, a computing system receives an entity resolution request. The entity resolution request can indicate a first entity (e.g., "Александр Иванов " with an address of "135 W. Union Ave, Baltimore MD, United States, 21201") and a second entity (e.g., "Dr. Sarah Jackson" with an address of "123 W. Union Avenue, Baltimore, Maryland, United States, 99801"). For example, a data steward may provide the entity resolution request to help determine whether the entities are the same or different.

Using the entity resolution request, the computing system can identify attributes in a data model. For example, the attributes can include name attributes (e.g., prefix, first name, middle name, last name, suffix) of a name object of an individual entity model. The computing system can then identify other attributes in the data model and/or other data models. For example, the other attributes can include address attributes (e.g., addressline1, addressline2, city, etc.) of an address object of the individual entity model.

The computing system can then create strings based on the identified attributes of the data model. For example, the computing system may concatenate a first set of attributes to create a first string and concatenate a second set of attributes to create a second string. The computing system can then generate a domain-agnostic large language model prompt based on the first string, and another domain-agnostic large language model prompt based on the second string. The computing system can provide the domain-agnostic large language model prompts to a domain-agnostic large language model (e.g., a Flan-T5 XL model that has not been trained on any domain-specific datasets, customer datasets, or the like). The large domain-agnostic language models can generate domain-agnostic large language model results. For example, the results may include a natural language result, such as "yes, it is a match . . . " or "no, it is not a match." In some embodiments, the results may include features scores (e.g., Full Name: 0.75, Address Line 1& 2: 0.63), Address City: 0.94, and First Name List: 0.47).

In some embodiments, the computing system can generate and/or execute approximator networks (e.g., approximator network models). The approximator networks can use a large language model (e.g., a domain-agnostic large language model) as a labeling tool to a prompt. Using the original strings that we used to create the prompt, and the large language model as the labeling tool, the computing system can create a smaller neural network whose aim is to only replicate the behavior of the large language model on that single question (e.g., without any ability to do anything else).

In some embodiments, the approximator networks are used to emulate the large language model prompts, and the approximator networks can be fully-connected neural networks trained with stochastic gradient descent, standard techniques like dropout, momentum, and/or early-stopping. In this way, the computing system may swap out a large language model (e.g., a domain-agnostic large language model) with the approximator networks for increased speed and efficiency.

The computing system can also clip the domain-agnostic large language model results. The computing system may clip the results to either a "yes" or a "no". For example, the computing system can identify the yes or no, and remove the remainder of the result. This can, for example, prevent any type of hallucination.

The computing system can also generate, by one or more downstream neural network classifiers, a final result based on the clipped domain-agnostic large language model results. For example, the final output may be a score based on the first and second large language model results. In some embodiments, the downstream neural network classifiers may combine features scores of the domain-agnostic large language model results to generate the final result.

The computing system can then merge, based on the final result, the first entity and the second entity. The computing system may merge the first and second entity because they are deemed, based on the final result, to be the same entity. For example, a data steward may look at the final result and determine that they are the same entity. In another example, the computing system may automatically determine they are the same entity (e.g., based on a comparison to a threshold score).

In various embodiments, a computing system is configured to identify matching data records within a set of data records and merge the matching data records. More specifically, the computing system can use both match rules and machine learning models (e.g., large language models, downstream neural network classifiers, etc.) executing in parallel to identify different data records that are potential matches even when the data records include different data structures, data formats, and/or information. For example, the match rules and machine learning models may both independently execute to independently determine a potential match. The system can present the potentially matching data records and indicate whether the match was determined based on the match rules and/or the machine learning matching models. A user can then select based on the determinations whether to merge the records (e.g., because they believe the data records are a match). By providing both rules-based and machine learning-based parallelized matching, the system can more efficiently and accurately identify matching data records, reduce computational requirements (e.g., memory, storage, processors) of subsequent operations on the data records, and provide the user with a higher confidence of a match (e.g., relative to a system that was only rules-based or machine learning-based).

In some embodiments, the computing system may also be configured to analyze match rules and the performance of those match rules in a live production environment. For example, the computing system may identify, on-the-fly, redundant match rules (e.g., match rules that produce substantially similar results), match rules that are too broad in scope (e.g., match rules that produce too many matching results), match rules that are too narrow in scope (e.g., match rules that produce too few matching results or match rules that are never triggered), and the like. The computing system may then generate, based on one or more machine learning models, one or more recommendations to improve match rule performance and matching results. For example, the computing system may recommend that match rules be merged, deleted, added, modified, and the like.

In various embodiments, a unique architecture enables efficient modelling of entities, relationships, and interactions that typically form the basis of a business. These models enable insights, scalability, and management capabilities not previously available in the prior art. It will be appreciated that with the information model discussed herein, there is no need to consider tables, foreign keys, or any of the low-level physicality of how the data is stored.

An information model may be utilized as a part of a multi-tenant platform. In a specific implementation, a configuration sits in a layer on top of a platform (e.g., a RELTIO® platform) and natively enjoys capabilities provided by the platform such as matching, merging, cleansing, standardization, workflow, and so on. Entities established in a tenant may be associated with custom and/or standard interactions of the platform. The ability to hold and link three kinds of data (i.e., entities, relationships, and interactions) in the platform and leverage the confluence of them in one place provides power to model and understanding to a business.

In various embodiments, the metadata configuration is based on an n-layer model. One example is a 3-layer model (e.g., which is the default arrangement). In some embodiments, each layer is represented by a JSON file (although it will be appreciated that many different file structures may be utilized, such as BSON or YAML).

The information models may be utilized as a part of a connected, multi-tenant system. FIG. 1 depicts a platform 102. The platform 102 enables seamless scaling in many operational or analytical use cases. The platform 102 may be the foundation of master data management (MDM). Various integration options, including a low-code/no-code solution, allow rapid deployment and time to value.

FIG. 1 is an example of functions of the platform 102 in some embodiments. The platform 102 may support best in class MDM capabilities, including identity resolution, data quality, dynamic survivorship for contextual profiles, universal ID across operational applications and hierarchies, knowledge graph to manage relationships, progressive stitching to create richer profiles, and governance capabilities. Further, the platform 102 may support high volume transactions, high volume API calls, sophisticated analytics, and back-end jobs for any workload in an auto-scaling cloud environment. As follows, the platform 102 may support high redundancy, fault tolerance, and availability with built-in NoSQL database, Elasticsearch, Spark, and other AWS and GCP services across multiple zones.

In various embodiments, the platform 102 is multi-domain and enables seamless integration of many types of data and from many sources to create master profiles of any data entity—person, organization, product, location. Users can create master profiles for consumers, B2B customers, products, assets, sites, and connect them to see the complete picture.

The platform 102 may enable API-first approach to data integration and orchestration. Users (e.g., tenants) can use APIs, and various application-specific connectors to ease integration. Additionally, in some embodiments, users can stream data to analytics or data science platforms for immediate insights.

Figure 2:
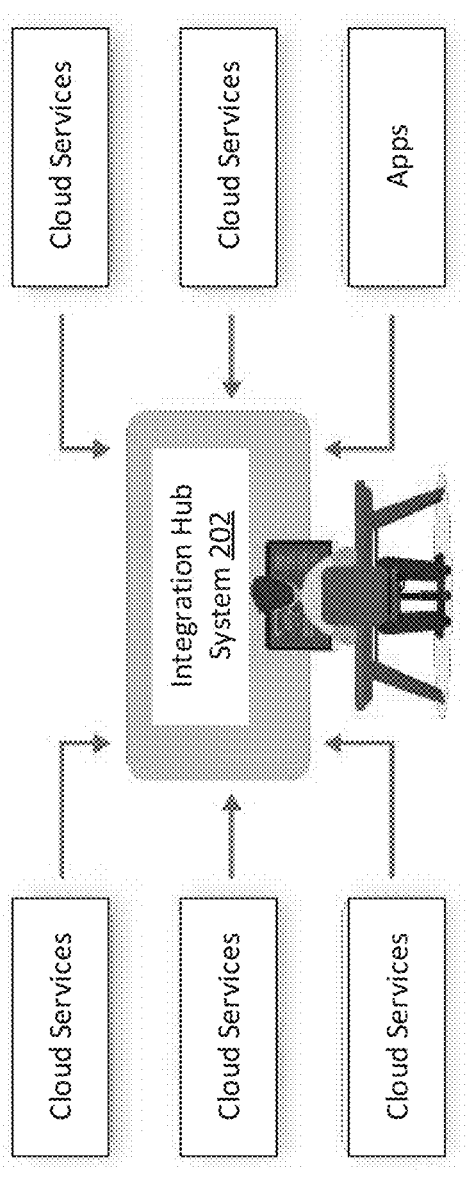
FIG. 2 depicts an environment for an integration hub system.

FIG. 2 depicts an environment for an integration hub system 202. The integration hub system 202 may connect various data sources and downstream consumers. In some embodiments, the integration hub system 202 comes with over 1,000 connectors to build data pipelines correctly. The integration hub system 202 may include an intuitive drag-and-drop graphical interface to create simple replication pipelines to complex data extraction and transformation tasks. With pre-built community recipes for common use cases, users can set up integration workflows in just a few clicks.

Along with the built-in data loader, event streaming capabilities, data APIs, and partner connectors, the integration hub system 202 enables rapid links to user systems using the platform 102. The integration hub system 202 may enable users to build automated workflows to get data to and from the platform 102 with any number of SaaS applications in just hours or days. Faster integration enables faster access to unified, trusted data to drive real-time business operations.

Figure 3:
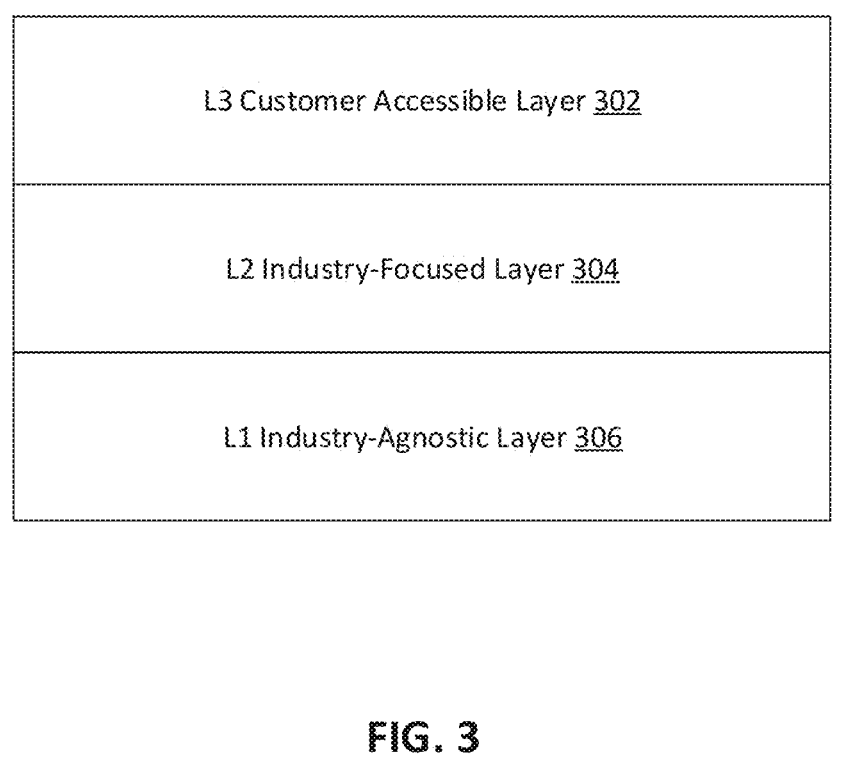

FIG. 3 depicts a three-layer model in some embodiments. Of the three layers, only layer 3 (e.g., the top layer of the n-layer model) 302, known as the "L3," is accessible by the customer. It is the layer that is a part of a tenant. The information associated with the L3 layer 302 may be retrieved from the tenant, edited. and applied back to the tenant using Configuration API.

The L3 layer 302 typically inherits from the L2 layer 304 (an industry-focused layer) which in turn inherits from the L1 layer 306 (an industry-agnostic layer). Usually, the L3 layer 302 refers to an L2 layer 304 container and inherits all data items (or "objects") from the L2 layer 304 container. However, it is not required that the L3 layer 302 refer to the L2 layer 304 container; it can stand alone.

The L2 layer 304 may inherit the objects from the L1 layer 306. Whereas there is only a single L1 layer 306 set of objects, the objects at the L2 layer 304 may be grouped into industry-specific containers. Like the L1 layer 306, the containers at the L2 layer 304 may be controlled by product management and may not be accessible by customers.

Life sciences is a good example of an L2 layer 304 container. The L2 layer 304 container may inherit the Organization entity type (discussed further herein) from L1 layer 306 and extend it to the Health Care Organization (HCO) type needed in life sciences. As such, the HCO type enjoys all of the attribution and other properties of the Organization type, but defines additional attributes and properties needed by an HCO.

The L1 layer 306 may contain entities such as Party (an abstract type) and Location. In some embodiments, the L1 layer 306 contains a fundamental relationship type called HasAddress that links the Party type to the Location type. The L1 layer 306 also extends the Party type to Organization and Individual (both are non-abstract types).

There may be only one L1 layer 306, and its role is to define industry-agnostic objects that can be inherited and utilized by industry specific layers that sit at the L2 layer 304. This enables enhancement of the objects in the L1 layer 306, potentially affecting all customers. For example, if an additional attribute was added into the HasAddress relationship type, it typically would be available for immediate use by any customer of the platform.

Any object can be defined in any layer. It is the consolidated configuration resulting from the inheritance between the three layers that is commonly referred to as the tenant configuration or metadata configuration. In a specific implementation, metadata configuration consolidates simple, nested, and reference attributes from all the related layers.

Values described in the higher layer override the values from the lower layers. The number of layers does not affect the inheritance.

FIG. 4 depicts a box diagram of some examples of entity type, relationship type, and event metadata. The platform 102 enables object types entities, relationships, and interactions. The entity type 402 may be a class of entity. For example, "Individual" is an entity type 402, and "Alyssa" represents a specific instance of that entity type. Other common examples of entity types include "Organization," "Location," and "Product."

Often, entity types can materialize in single instances, such as the "Alyssa" example above. In another example, the L1 layer 306 may define the abstract "Party" entity type with a small collection of attributes. The L1 layer 306 may then be configured to define the "Individual" entity type and the "Organization" entity type, both of which inherit from "Party," are non-abstract, and add additional attributes specific to their type and business function. Continuing with the concept of inheritance, in the L2 layer 304 Life Sciences container, the HCP entity may be defined (e.g., to represent physicians) which inherits from the "Individual" type but also defines a small collection of attributes unique to the HCP concept. Thus, there is an entity taxonomy "Party," "Individual," or "HCP," and the resulting HCP entity type provides the developer and user with the aggregate attribution of "Party," "Individual," and "HCP."

Once the entity types are defined, the user can link entities together in a data model by using the relationship type. Once the user defines entity types, they can be linked by defining relationships between them. For example, a user can post a relationship independently to link two entities together, or the user can mention a relationship in a JSON, which then posts the relationship and the two entities all at once.

A relationship type 404 describes the links or connections between two specific entities (e.g., entities 406 and 408). A relationship type 404 and the entities 406 and 408 described together form a graph. Some common relationship types are Organization to Organization, Subsidiary Of, Partner Of, Individual to Individual, Parent Of/Child Of, Reports To, Individual to Organization/Organization to Individual, Affiliated With, Employee Of/Contractor Of.

The platform 102 may enable the user to define metadata properties and attributes for relationship types. The user can define up to any number of metadata properties. The user can also define several attributes for a relationship type, such as name, description, direction (undirected, directed, bi-directional), start and end entities, and more. Attributes of one relationship type can inherit attributes from other relationship types.

Hierarchies may be defined through the definition of relationship subtypes. For example, if a user defines "Family" as a relationship type, the user can define "Parent" as a subtype. One hierarchy contains one or many relationship types; all the entities connected by these relationships form a hierarchy. Entity A>HasChild (Entity B)>HasChild (Entity C). Then A, B, and C form a hierarchy. In the same hierarchy, the user can add Subsidiary as a relationship, and if Entity D is a subsidiary of Entity C, then A, B, C, and D all become part of a single hierarchy.

Interactions 410 are lightweight objects that represent any kind of interaction or transaction. As a broad term, interaction 410 stands for an event that occurs at a particular moment such as a retail purchase or a measurement. It can also represent a fact in a period of time such as a sales figure for the month of June.

Interactions 410 may have multiple actors (entities), and can have varying record lengths, columns, and formats. The data model may be defined using attribute types. As a result, the user can build a logical data model rather than relying on physical tables and foreign keys; define entities, relationships, and interactions in granular detail; make detailed data available to content and interaction designers; and provide business users with rich, yet streamlined, search and navigation experiences.

In various embodiments, four manifestations of the attribute type include Simple, Nested, Reference, and Analytic. The Simple attribute type represents a single characteristic of an entity, relationship, or interaction. The nested, reference and analytic attribute types represent combinations or collections of simple sub-attribute types.

The nested attribute type is used to create collections of simple attributes. For example, a phone number is a nested attribute. The sub-attributes of a phone number typically include Number, Type, Area code, Extension. In the example of a phone number, the sub-attributes are only meaningful when held together as a collection. When posted as a nested attribute, the entire collection represents a single instance, or value, of the nested attribute. Posts of additional collections are also valid and serve to accumulate additional nested attributes within the entity, relationship, or interaction data type.

The reference attribute type facilitates easy definition of relationships between entity types in a data model.

A user may utilize the reference attribute type when they need one entity to make use of the attributes of another entity without natively defining the attributes of both. For example, the L1 layer in the information model defines a relationship that links an Organization and an Individual using the AffiliatedWith relationship type. The AffiliatedWith relationship type defines the Organization entity type to be a reference attribute of the Individual entity type. This approach to data modeling enables easier navigation between entities and easier refined search.

Easier navigation between entities: In the example of the Organization and Individual entities that are related using the AffiliatedWith relationship type, specifying an attribute of previous employer for the Individual entity type enables this attribute to be presented as a hyperlink on the individual's profile facet. From there, the user can navigate easily to the individual's previous employer.

Easily refined search: When attributes of a referenced entity and relationship type are available to be indexed as though they were native to the referencing entity, business users can more easily refine search queries. For example, in a search of a data set that contains 100 John Smith records, entering John Smith in the search box will return 100. John Smith records. Adding Acme to the search criteria will return only those records with John Smith that have a reference, and thus an attribute, that contains the word Acme.

The analytic attribute type is lightweight. In various embodiments, it is not managed in the same way that other attributes are managed when records come together during a merge operation. The analytic attribute type may be used to receive and hold values delivered by an analytics solution. The user may utilize the analytic attribute type when they want to make a value from an analytics solution, such as Reltio Insights, available to a business user or to other applications using the Reltio Rest API. For example, if an analytics implementation calculates a customer's lifetime value and the user needs that value to be available to the user while they are looking at the customer's profile, the user may define an analytic attribute to hold this value and provide instructions to deliver the result of the calculation to this attribute.

In a specific implementation, the platform 102 assigns entity IDs (EIDs) to each item of data that enters the platform. As such, the platform can appropriately be characterized as including an EID assignment engine. Importantly, a lineage-persistent relational database management system (RDBMS) retains the EIDs for each piece of data, even if the data is merged and/or assigned a new EID. As such, the platform can appropriately be characterized as including a legacy EID retention engine, which has the task of ensuring when new EIDs are assigned, legacy EIDs are retained in a legacy EID datastore. The legacy EID retention engine can at least conceptually be divided into a legacy EID survivorship subengine responsible for retaining all EIDs that are not promoted to primary EID as legacy EIDs and a lineage EID promotion subengine responsible for promoting an EID of a first data item merged with a second data item to primary EID of the merged data item. An engine responsible for changing data items, including merging and unmerging (previously merged) data items can be characterized as a data item update engine. Cross-tenant durability also becomes possible when legacy EIDs are retained. In a specific implementation, a cross-tenant durable EID lineage-persistent RDBMS has an n-Layer architecture, such as a 3-Layer architecture.

Data may come from multiple sources. The process of receiving data items can be referred to as "onboarding" and, as such, the platform 102 can be characterized as including a new dataset onboarding engine. Each data source is registered and, in a specific implementation, all data that is ultimately loaded into a tenant will be associated with a data source. If no source is specified when creating a data item (or "object"), the source may have a default value. As such, the platform can be characterized as including an object registration engine that registers data items in association with their source.

A crosswalk can represent a data provider or a non-data provider. Data providers supply attribute values for an object and the attributes are associated with the crosswalk. Non-data providers are associated with an overall entity (or relationship); it may be used to link an L1 (or L2) object with an object in another system. Crosswalks do not necessarily just apply to the entity level; each supplied attribute can be associated with data provider crosswalks. Crosswalks are analogous to the Primary Key or Unique Identifier in the RDBMS industry.

The engines and datastores of the platform 102 can be connected using a computer-readable medium (CRM). A CRM is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in nontrivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Matching is a powerful area of functionality and can be leveraged in various ways to support different needs. The classic scenario is that of matching and merging entities (Profiles). Within the architecture discussed herein, relationships that link entities can also and often do match and merge into a single relationship. This may occur automatically and is discussed herein.

Matching can be used on profiles within a tenant to deduplicate them. It can be used externally from the tenant on records in a file to identify records within that file that match to profiles within a tenant. Matching may also be used to match profiles stored within a Data Tenant to those within a tenant.

Figure 5:
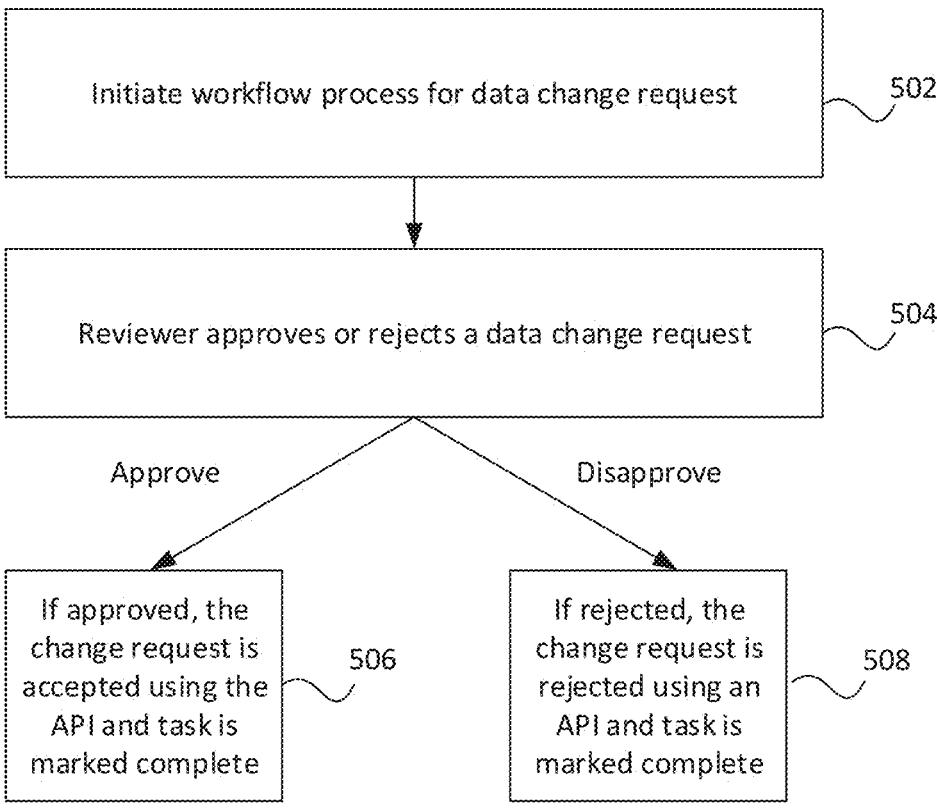
FIG. 5 depicts a dynamic matching facilitation flowchart.

FIG. 5 depicts a dynamic matching facilitation flowchart. The match architecture is responsible for identifying profiles within the tenant that are considered to be semantically the same or similar. A user may establish a match scheme using the match configuration framework. In some embodiments, the user may utilize machine learning techniques to match profiles. In step 502, the user may create match rules. In step 504, the user may identify the attributes from entity types they wish to use for matching. In step 506, the user may write a comparison formula within each match rule which is responsible for doing the actual work of comparing one profile to another. In step 508, the user may map token generator classes that will be responsible for creating match candidates.

Unlike other systems, in various embodiments, the architecture is designed to operate in real-time. Prior to the match process and merge processes occurring, every profile created or updated is may be cleansed on-the-fly by the profile-level cleansers. Thus the 3-step sequence of cleanse, match, merge may be designed to all occur in real-time anytime a profile is created or updated. This behavior makes the platform 102 ideal for real-time operational use within a customer's ecosystem.

Lastly, the survivorship architecture is responsible for creating the classic "golden record", but in a specific implementation, it is a view, materialized on-the-fly. It is returned to any API call fetching the profile and contains a set of "Operational Values" from the profile, which are selected in real time based on survivorship rules defined for the entity type.

In various embodiments, matching may operate continuously and in real time. For example, when a user creates or updates a record in the tenant, the platform cleanses and processes the record to find matches within the existing set of records.

Each entity type (e.g., contact, organization, product) may have its own set of match groups. In some embodiments, each match group holds a single rule along with other properties that dictate the behavior of the rule within that group. Comparison Operators (e.g., Exact, ExactOrNull, and Fuzzy) and attributes may comprise a single rule.

Match tokens may be utilized to help the match engine quickly find candidate match values. A comparison formula within a match rule may be used to adjudicate a candidate match pair and will evaluate to TRUE or FALSE (or a score if matching is based on relevance).

In some embodiments, the matching function may do one of three things with a pair of records: Nothing (if the comparison formula determines that there is no match); Issue a directive to merge the pair; Issue a directive to queue the pair for review by a data steward. In some embodiments, the architecture may include the following:

1) Entities and relationships each have configurable attribution capability.
2) Values found in an attribute are associated with a crosswalk held within an entity or relationship object. Each profile can have multiple crosswalks, each contributing one or more values. Data may come from multiple sources. Each source may be registered, and all data loaded into a tenant will be associated with a data source. Each supplied attribute may be associated with data provider crosswalks. Crosswalks are analogous to the Primary Key or Unique Identifier in relational database management system (RDBMS). A crosswalk can represent a data provider or a non-data provider.
3) Data providers supply attribute values for an object and the attributes are associated with the crosswalk.
4) Non-data providers are associated with an overall entity (or relationship). In this case it is simply used to link an object in a RELTIO® system with an object in another system. Supplied attributes may NOT be associated with this crosswalk.
5) Profiles can be matched and merged, but relationships are also matched and merged. While the user may develop match rules to govern the matching and merging of profiles, merging of relationships is automatic and intrinsic to the platform. Any two relationships of the same type, that each have entity A at one endpoint and entity B at their other endpoint, will merge automatically.
6) An attribute is intrinsically multi-valued, meaning it can hold multiple values. This means any attribute can collect and store multiple values from contributing sources or through merging of additional crosswalks. Thus, if a match rule utilizes the first name attribute, then the match engine will by default, compare all values held within the first name attribute of record A to all values held within the first name attribute of record B, looking for matches among the values. The user may elect to only match on operational values if desired.

7) When two profiles merge, the resulting profile contains the aggregate of all the crosswalks of the two contributing profiles and thus the associated attributes and values from those crosswalks. The arrays behind the attributes naturally merge as well, producing for each attribute an array that holds the aggregation of all the values from the contributing attributes. Relationships benefit from the same architecture and behave in the same manner as described for merged entities. The surviving entity ID (or relationship ID) for the merged profile (or relationship) is that of the oldest of the two contributors. Other than that, there really isn't a concept of a winner object and a loser object.

8) When two profiles merge the resulting profile contains references to all the interactions that were previously associated with the contributing profiles. (Note that Interactions do not reference relationships.)

9) If profile B is unmerged from the previous merge of A and B, then B will be reinstated with its original entity ID. All of the attributes (and associated values), relationships, and interactions profile B brought into the merged profile will be removed from the merged profile and returned to profile B.

The matchGroups construct is a collection of match groups with rules and operators that are needed for proper matching. If the user needs to enable matching for a specific entity type in a tenant, then the user may include the matchGroups section within the definition of the entity type in the metadata configuration of the tenant. The matchGroups section will contain one or more match groups, each containing a single rule and other elements that support the rule.

Looking at a match group in a JSON editor, the user can easily see the high-level, classic elements within it. The rule may define a Boolean formula (see the AND operator that anchors the Boolean formula in this example) for evaluating the similarity of a pair of profiles given to the match group for evaluation. It is also within the rule element that four other very common elements may be held: ignoreInToken (optional), Cleanse (optional), matchTokenClasses (required), and comparatoiClasses (required). The remaining elements that are visible (URI, label, and so on), and some not shown in the snapshot, surround the rule and provide additional declarations that affect the behavior of the group and in essence, the rule.

Each match group may be designated to be one of four types: automatic, suspect, <custom>, and relevance_based, as described below. The type the user selects may govern whether the user develops a Boolean expression for the comparison rule or an arithmetic expression. The types are described below.

Behavior of the automatic type: With this setting for type, the comparison formula is purely Boolean and if it evaluates to TRUE, the match group will issue a directive of merge which, unless overridden through precedence, will cause the candidate pair to merge.

Behavior of the suspect type: With this setting for type, the comparison formula is purely Boolean and if it evaluates to TRUE, the match group will issue a directive of queue for review which, unless overridden through precedence, will cause the candidate pair to appear in the "Potential Matches View" of the MDM UI.

Behavior of the relevance_based type: Unlike the preceding rules, all of which are based on a Boolean construction of the rule formula, the relevance-based type expects the user to define an arithmetic scoring algorithm. The range of the match score determines whether to merge records automatically or create potential matches.

If a negativeRule exists in the matchGroups and it evaluates to TRUE, any merge directives from the other rules are demoted to queue for review. Thus, in that circumstance, no automatic merges will occur. The Scope parameter of a match group defines whether the rule should be used for Internal Matching or External Matching or both. External matching occurs in a non-invasive manner and the results of the match job are written to an output file for the user to review. Values for Scope are: ALL—Match group is enabled for internal and external matching (Default setting). NONE—Matching is disabled for the match group. INTERNAL—Match group is enabled for matching records within the tenant only. EXTERNAL—Match group is enabled only for matching of records from an external file to records within the tenant; in a specific implementation, external matching is supported programmatically via an External Match API and available through an External Match Application found within a console, such as a RELTIO® Console.

If set to TRUE, then only the OV of each attribute will be used for tokenization and for comparisons. For example, if the First Name attribute contains "Bill", "William", "Billy", but "William" is the OV, then only "William" will be considered by the cleanse, token, and comparator classes.

The rule is the primary component within the match group. It contains the following key elements each described in detail: IgnoreInToken, Cleanse, matchTokenClasses, comparatoiClasses, Comparison formula.

A negative rule allows a user to prevent any other rule from merging records. A match group can have a rule or a negative rule. The negative rule has the same architecture as a rule but has the special behavior that if it evaluates to true, it will demote any directive of merge coming from another match group to queue for review. To be sure, most match groups across most customers' configurations use a rule for most matching goals. But in some situations, it can be advantageous to additionally dedicate one or more match groups to supporting a negative rule for the purpose of stopping a merge based on usually a single condition. And when the condition is met, the negative rule prevents any other rule from merging the records. So in practice, the user might have seven match groups each of which use a rule, while the eighth group uses a negative rule.

The platform 102 may include a mechanism to proactively monitor match rules in tenants across all environments. In some embodiments, after data is loaded into the tenant, the proactive monitoring system inspects every rule in the tenant over a period of time and the findings are recorded. Based on the percentage of entities failing the inspections, the proactive monitoring system detects and bypasses match rules that might cause performance issues and the client may be will be notified. The bypassed match rules will not participate in the matching process.

In various embodiments, the user receives a notification when the proactive monitoring system detects a match rule that needs review. ScoreStandalone and scoreIncremental elements may be used to calculate a Match Score for a profile that is designated as a potential match and can assist a data steward when reviewing potential matches.

Relevance-based matching is designed primarily as a replacement of the strategy that uses automatic and suspect rule types. With Relevance-based matching, the client may create a scoring algorithm of the user's own design. The advantage is that in most cases, a strategy based on Relevance-based matching can reduce the complexity and overall number of rules. The reason for this is that the two directives of merge and queue for review which normally require separate rules (automatic and suspect respectively) can often be represented by a single Relevance-based rule.

A workflow is a series of sequential steps or tasks that are carried out based on user-defined rules or conditions to execute a business process. The workflow may allow a user to manage complex business processes through a series of predetermined steps or tasks. The platform 102 may utilize the workflow to enable processes and tasks management, including the assignment and tracking of the tasks. A workflow process may support a creator, a create date, a due date, an assignee, steps, and comments. In various embodiments, workflow business processes are configurable. In some embodiments, the various actors and triggers in a workflow are Actors: The people and processes that participate in the workflow are the actors, e.g., Reviewer, Workflow Engine, Hub, and API; Reviewer: The user will be assigned with the role ROLE_REVIEWER; Trigger: It is a scheduled process that scans activity logs to initiate a review workflow, e.g., from the UI, you can start a Data Change Request workflow to review the updates or the changes to the entities or the profiles data in your tenant. The workflow feature may allow a user to manage business processes through a series of predetermined steps or tasks which enables you to plan and coordinate user tasks, validations, reviews, and approvals for multiple records.

Data Change Request (DCR) is a collection of suggested data changes. Users who do not have rights to update objects, such as the customer sales representatives, can suggest changes. These suggested changes will be accumulated in DCRs queued for review and approval by people with approval privileges, such as the data stewards. Examples of suggested data changes include adding a new attribute value, updating an attribute value, deleting an attribute value, and creating a new object along with referenced objects. DCRs can be initiated using a web browser-based user interface for desktop or mobile applications. An example of a step can be a user task assigned to users for Review and Approval of the DCR. In this example, a workflow for a DCR includes the following sequence of steps in the flowchart of FIG. 5.

In step 502, on the profile page in Hub, users can initiate the DCR workflow process in the Suggesting mode.

In step 504, the Reviewer can Approve or Reject the DCR. In the DCR Review pane of the UI, sub-attributes within the nested, reference, or complex attributes, and parent-nested attributes, have a label of the attribute value.

In step 506, if the Reviewer approves the DCR, the change request is accepted using the API and the task is marked complete.

In alternative step 508, if the Reviewer rejects the DCR, the change request is rejected using the API and the task is marked complete. In the Inbox, you have the option of partially rejecting changes from a DCR. In various embodiments, a reviewer may selectively reject attributes and approve a DCR partially.

Figure 6:
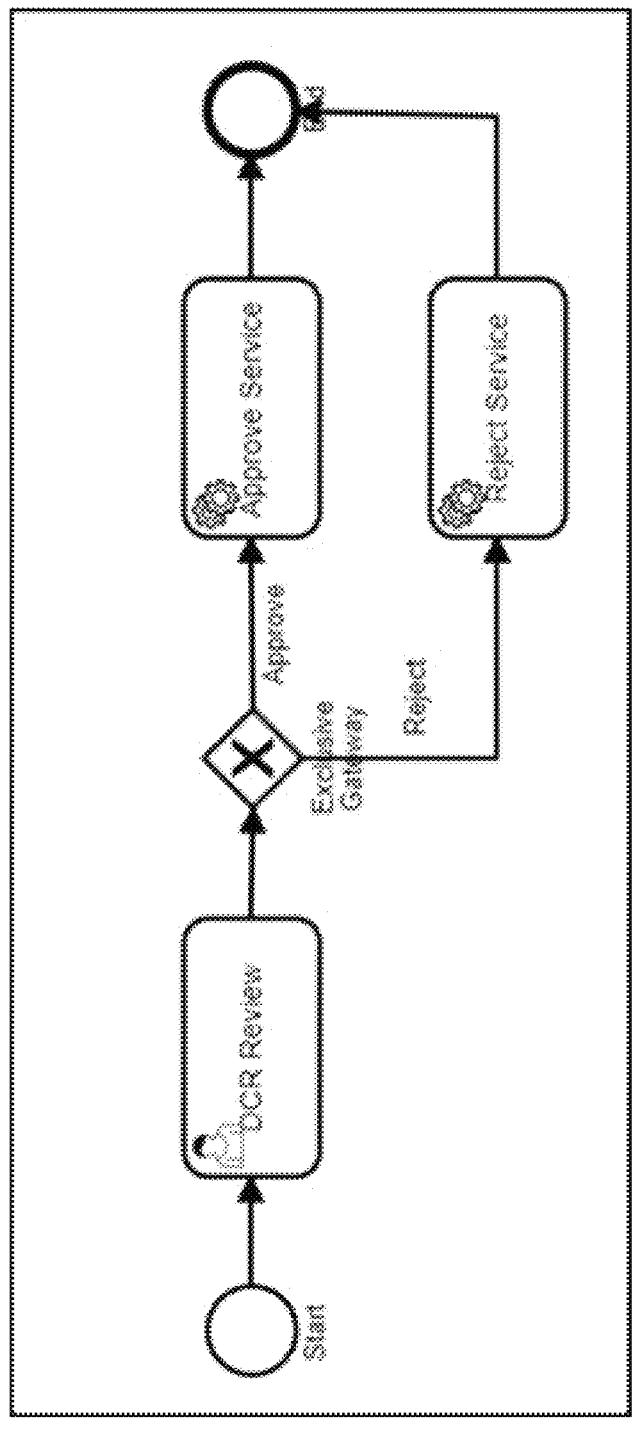
FIG. 6 depicts a graphical diagram of the data change request (DCR) workflow review process of FIG. 5.

FIG. 6 depicts a graphical diagram of the DCR workflow review process of FIG. 5.

From a business user's perspective, a workflow may be initiated (manually or automatically) for one or multiple profiles. As a user assigned to the task, the approver can either review the proposed changes or enter a comment.

Figure 8:
FIGS. 7 and 8 are examples of data change request review panes for a user interface (UI).
Figure 7:
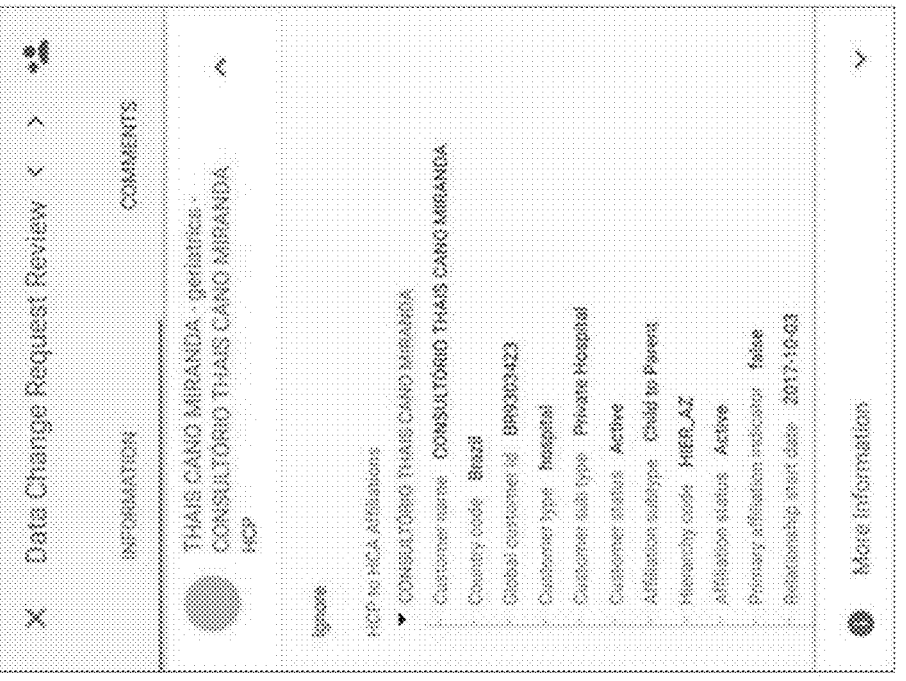

FIG. 7 is an example data change request review pane for the UI in some embodiments. FIG. 8 is another example data change request review pane for the UI in some embodiments. In the example DCR Review pane, sub-attributes within the nested, reference, or complex attributes, and parent-nested attributes, have a label of the attribute value, as shown in these examples.

To ensure that data stewards can make an informed decision about approving or rejecting a DCR, the ADDITIONAL DETAILS tab is available in the DCR Review panel. FIG. 9 depicts an additional details tab in the DCR Review panel in some embodiments. The ADDITIONAL DETAILS tab shows external information of a DCR related to an active task stored by the users. This can be any information that can help the data stewards during the approval process. This external information may be available in the JSON format.

Partial reject may be automatically enabled for users who have the DELETE permission on the MDM:data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application.

Figure 10:
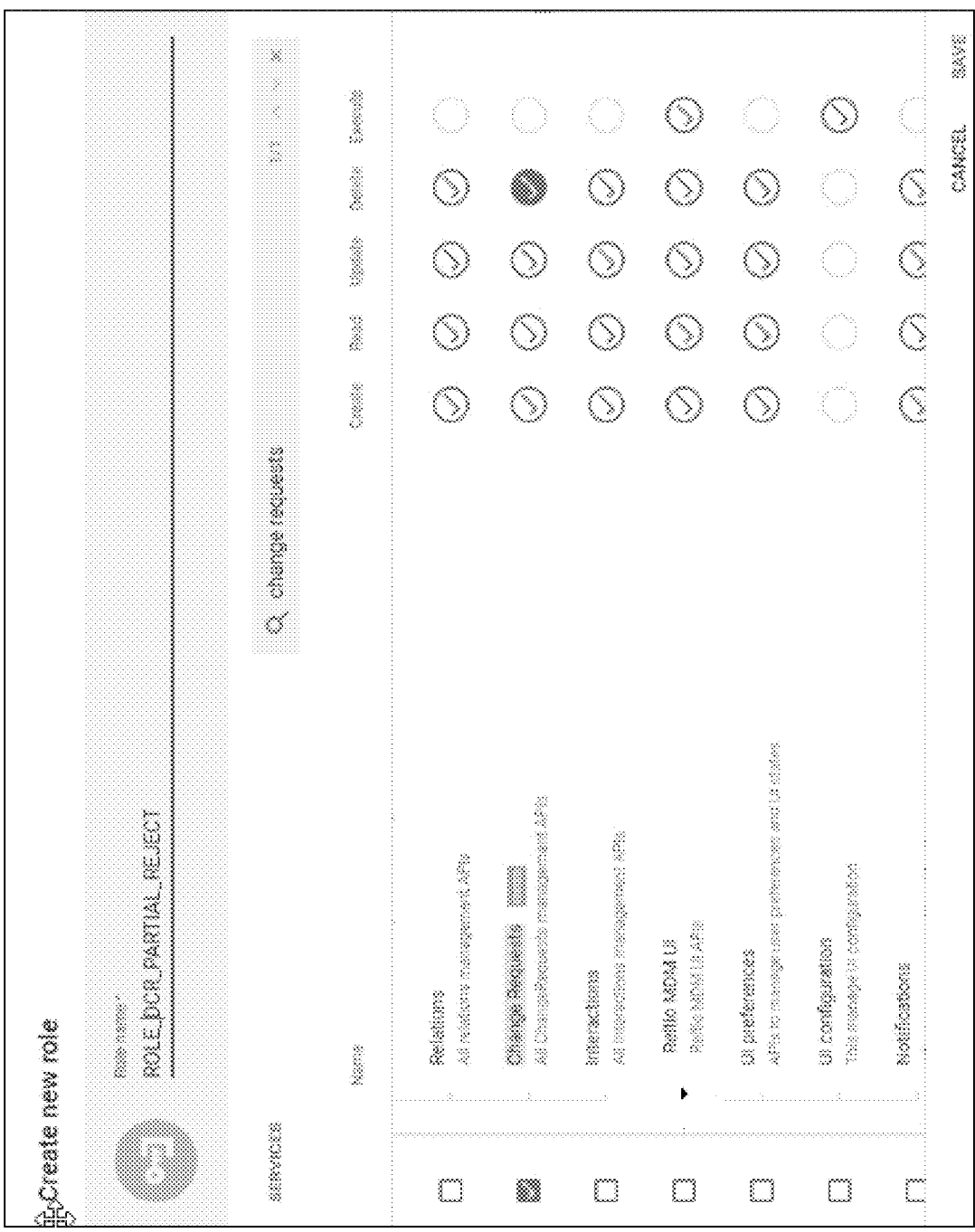
FIG. 10 depicts an interface to create a new role.

FIG. 10 depicts an interface to create a new role in some embodiments. In this example of FIG. 10, a new role is created with exact permissions (delete).

Figure 11:
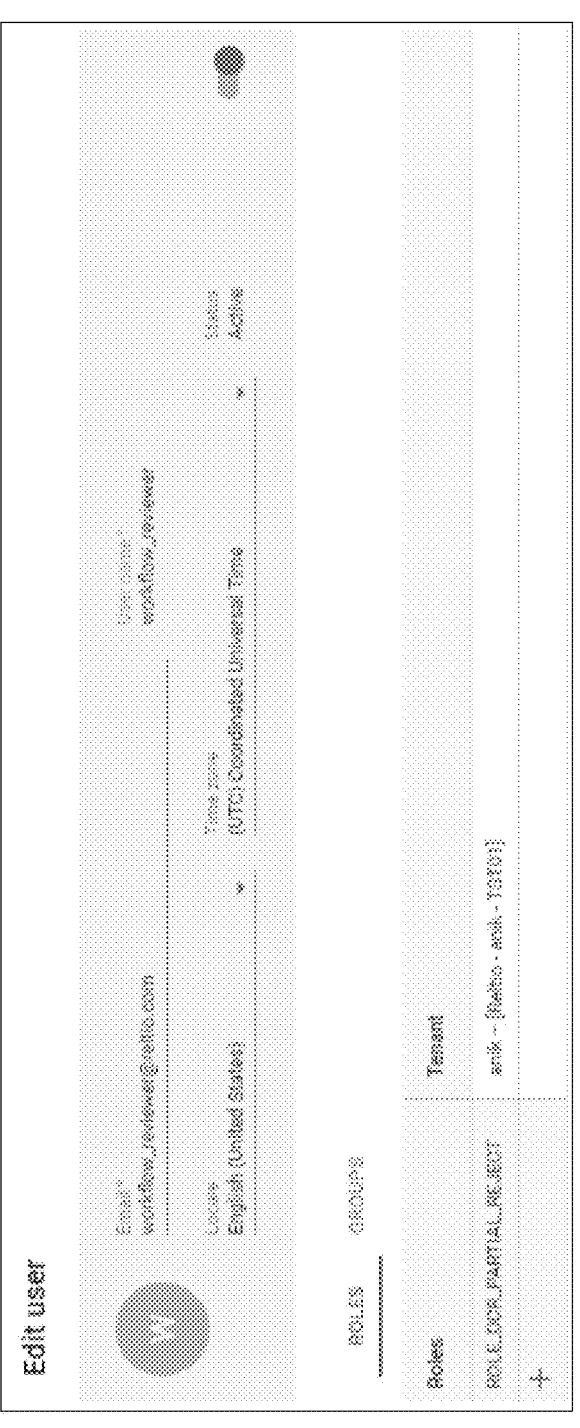
FIG. 11 depicts an interface to edit a user.

FIG. 11 depicts an interface to edit a user. In this example of FIG. 11, the role is assigned to user/users/group of users on the relevant tenants. A user can partially reject the attributes in a DCR for entities and relationships. This includes nested attributes and sub-attributes of a nested attribute. In addition, you can reject the entire DCR, which prevents the creation of the new entities or relationships.

Figure 12:
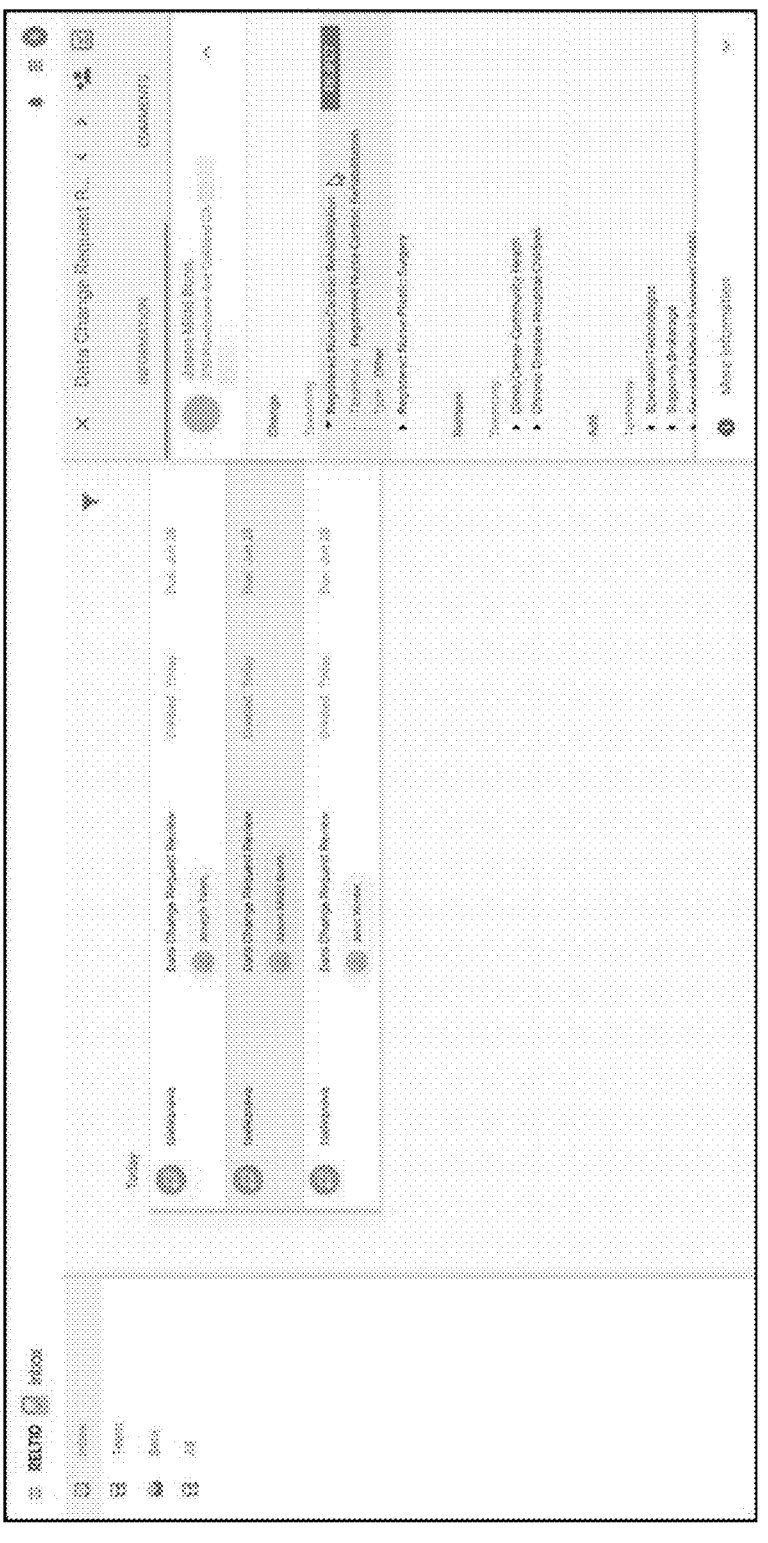
FIG. 12 depicts an interface for a data change request.

FIG. 12 depicts an interface for a DCR in some embodiments. In the interface depicted in FIG. 12, the user may select the task by clicking on the task in the Inbox tab and view the detailed information on the right panel. When you mouse over the change, the REJECT option may appear.

Figure 13:
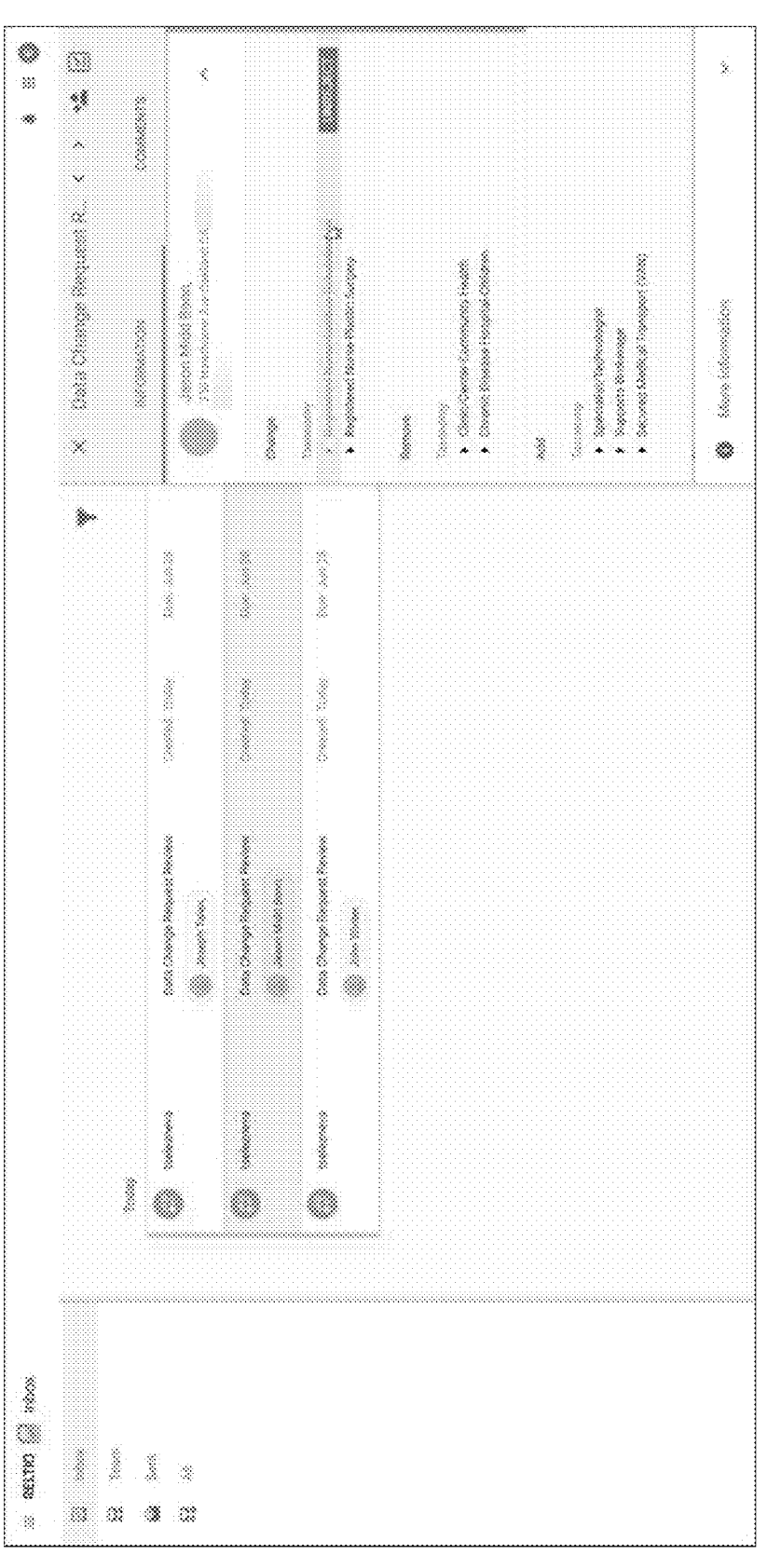
FIG. 13 depicts the interface for a data change request including an "unreject" option.

FIG. 13 depicts the interface for a data change request including an "unreject" option. The user may select the task by clicking on the task in the Inbox tab and view the detailed information on the right panel. When the user mouses over the change, the REJECT option appears.

In this example, the user may click the REJECT option corresponding to the change they want to reject. The rejected changes appear as struck out but are not deleted from the DCR until the task is approved. If the user moves to any other tab without approving the task, all rejections may be canceled. If the user chooses not to reject the change from the DCR, the user may click the UNREJECT button.

In some embodiments, reject does not work for start/end dates, roles, and tags for new entities/relationships. There may not be validation of dependencies for rejected new entities. If there is a reference attribute for this entity, it may continue to exist without changes.

In some embodiments, when changing a relationship, the old relationship is removed, and a new relationship is added. Hence, while rejecting the changes made to a relationship, both the actions remove and add may be rejected.

Figure 14:
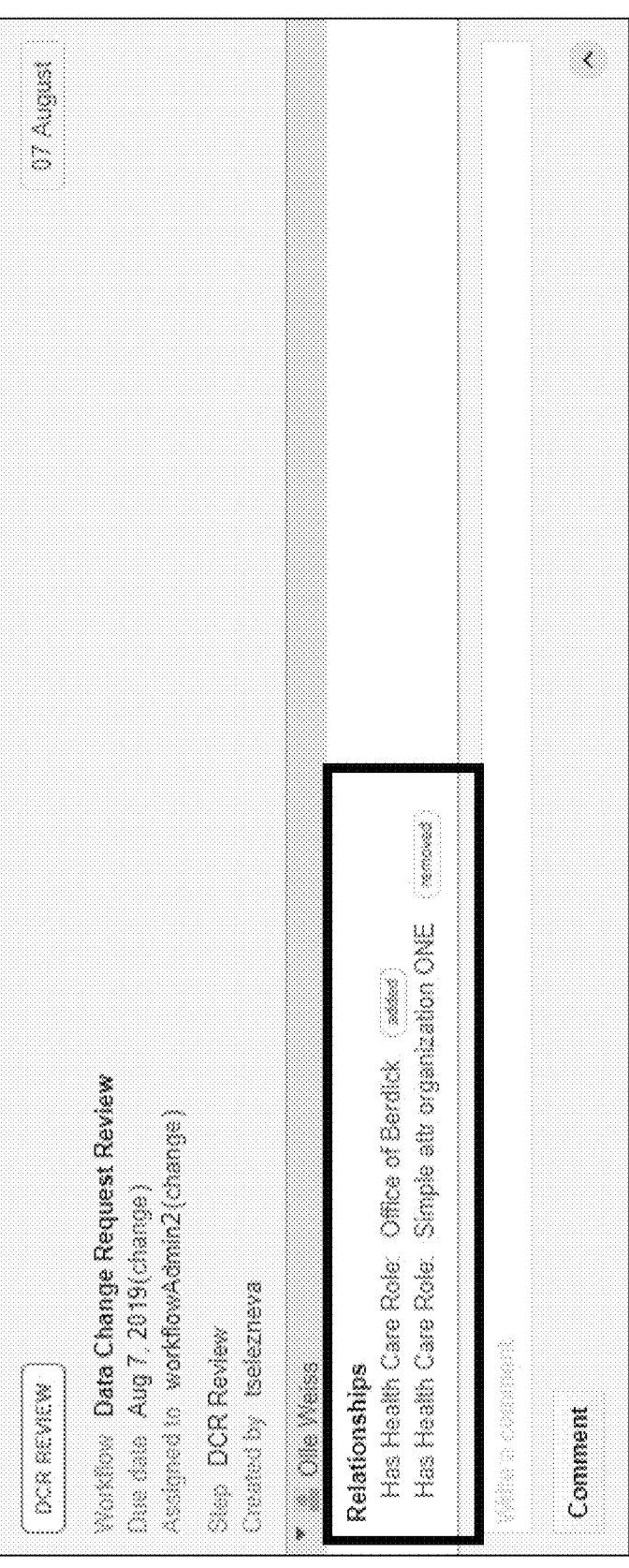
FIG. 14 depicts an interface for a data change request review depicting relationships status.

FIG. 14 depicts an interface for a data change request review depicting relationships status in some embodiments. If both the actions are not rejected, the following changes may take place: No relationships may exist if the added relationship is rejected and the removed relationship is applied; and Two relationships may exist if the added relationship is applied and the removed relationship is rejected.

Figure 15:
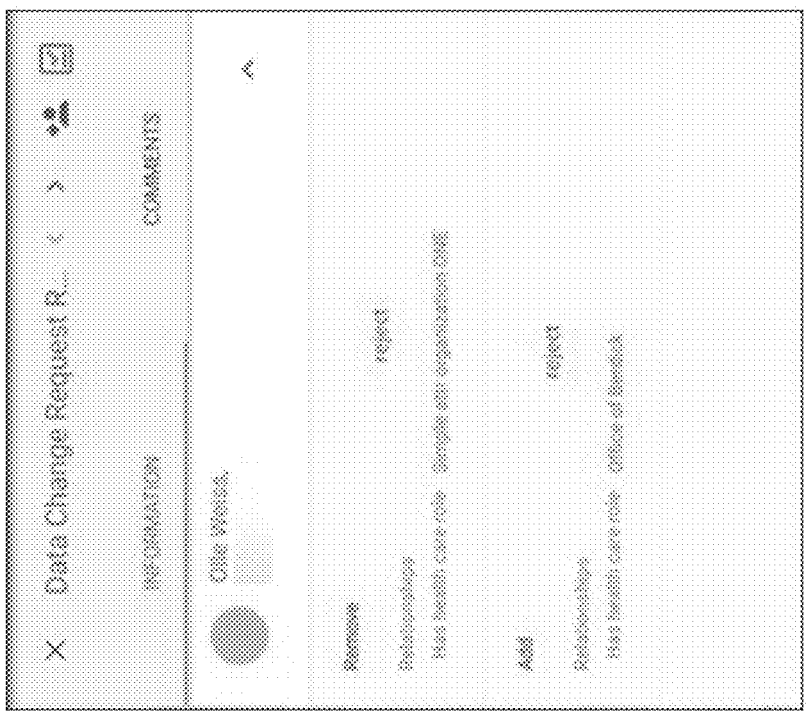
FIG. 15 depicts an interface for a data change request.

FIG. 15 depicts an interface for a data change request in some embodiments. Changes to relationships and their attributes, or new or deleted relationships, may be shown in the right-side panel as depicted in the interface of FIG. 16 in some embodiments.

If a new relationship has been added and attributes are provided, a caret icon may appear near the title of the relationship. Clicking the caret icon will cause the added attributes to be displayed.

Figure 16:
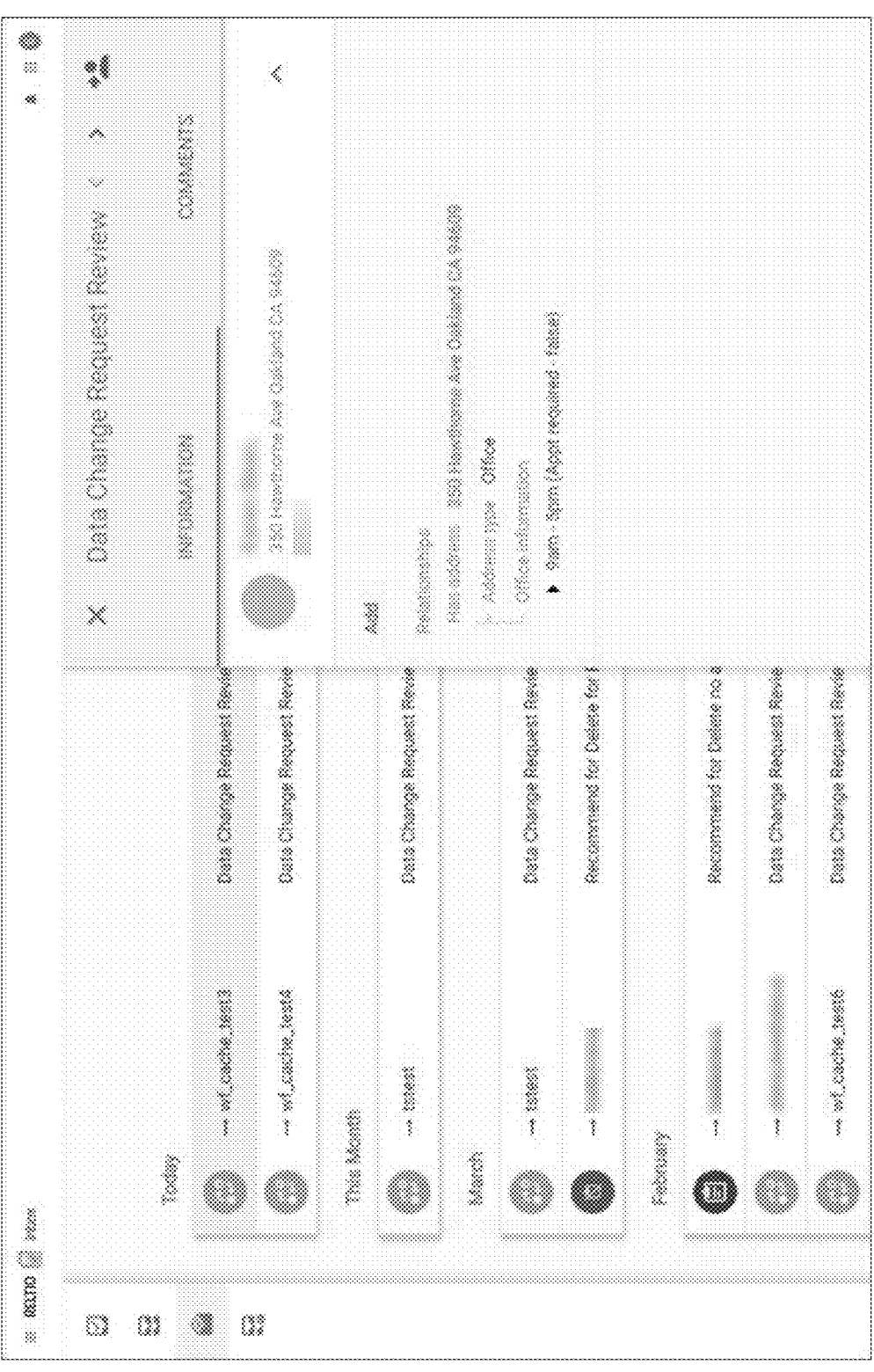
FIGS. 16, 17, and 18 depict changes to relationships and their attributes, or new or deleted relationships.
Figure 17:
Figure 18:
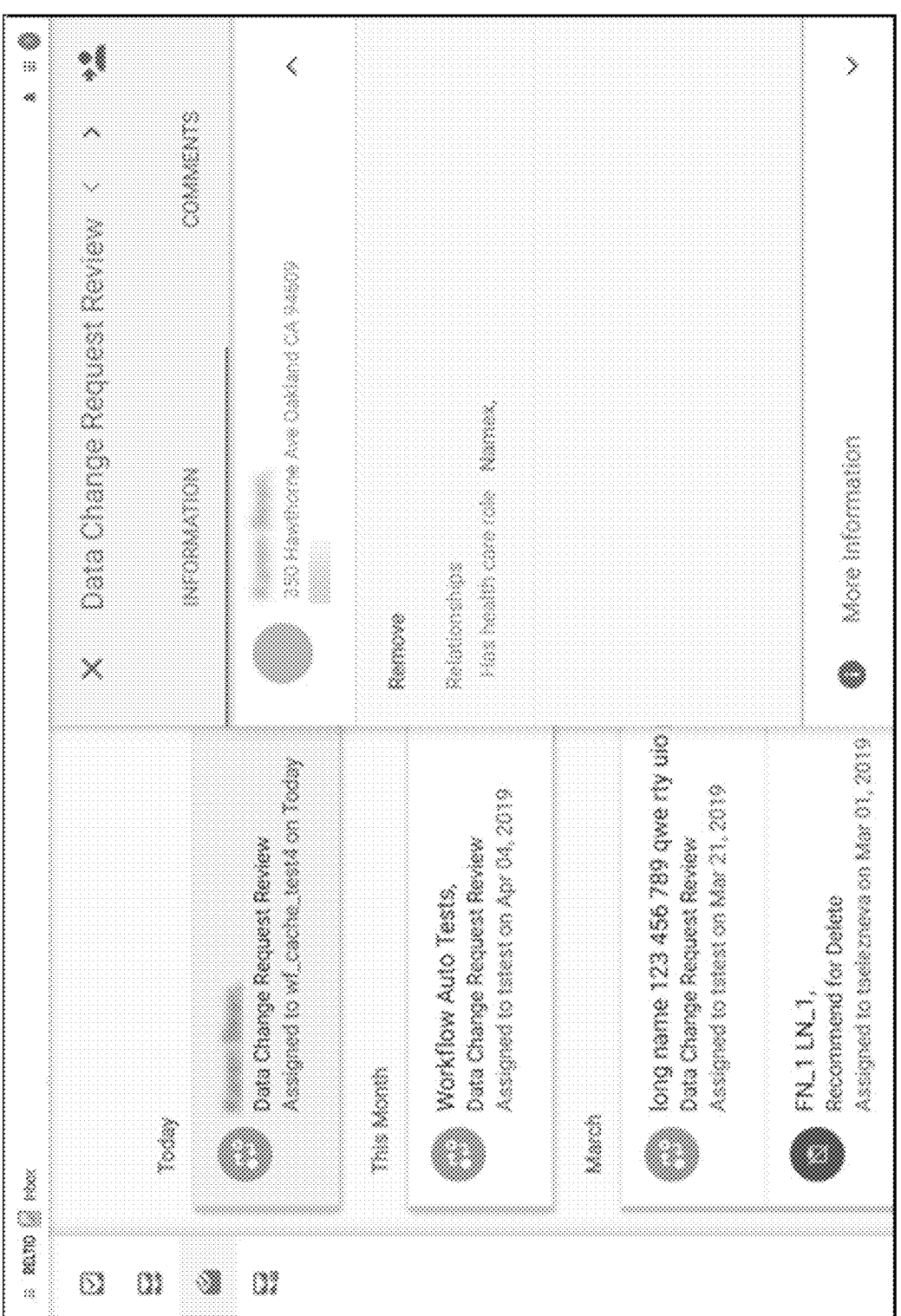

FIGS. 16, 17, and 18 depict changes to relationships and their attributes, or new or deleted relationships. If attributes have been added to an existing relationship, they may be visible at once with dashed lines from the title of the relationship to each attribute as depicted in FIG. 16. The same behavior occurs for attributes that have been changed. If a relationship was deleted, no attributers may be shown as depicted in the interface of FIG. 17 in some embodiments. If the user changes or deletes any attributes for a relationship, they are displayed similar to other attributes. Attributes for which no changes are made remain unaffected.

When a DCR is assigned to a user for review, the user may receive an email notification. When a DCR is approved or rejected, the DCR initiator may receive an email notification with the approval status, name of the approver, and comments from the person who approved. Partial reject may be automatically enabled for users who have the DELETE permission on the MDM:data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application to create a new role with the exact permission (DELETE); assign this role to user/users/group of users on the relevant tenants; or Task Action—The task must be assigned to your user account.

The reviewer may partially reject the attributes in a DCR for entities and relationships. This includes nested attributes and sub-attributes of a nested attribute. In addition, the reviewer can reject the entire DCR that prevents the creation of the new entities or relationships. To partially reject changes, you first select the task by clicking on the task in the Inbox tab and view the detailed information on the right panel; when you mouse over the change, the REJECT option appears. Then you click the REJECT option corresponding to the change the reviewer wants to reject. The rejected changes may appear as struck out but are not deleted from the DCR till the task is approved. If you move to any other tab without approving the task, all rejections are canceled. If you choose not to reject the change from the DCR, click the UNREJECT button.

Example limitations to rejecting attributes in some embodiments include reject does not work for start/end dates, roles, and tags for new entities/relationships; and there is no validation of dependencies for rejected new entities. If there is a reference attribute for this entity, it will continue to exist without changes.

When changing a relationship, the old relationship is removed, and a new relationship is added. So, while rejecting the changes made to a relationship, both the actions remove and add may be rejected. If both the actions are not rejected, the following changes may take place: 1) No relationships may exist if the added relationship is rejected, and the removed relationship is applied; 2) Two relationships may exist if the added relationship is applied and the removed relationship is rejected.

Changes to relationships and their attributes, or new or deleted relationships, may be shown in the UI. In some embodiments, if a new relationship has been added and attributes are provided, a caret icon appears near the title of the relationship. Click the caret icon to see the added attributes. If attributes have been added to an existing relationship, they are visible at once with dashed lines from the title of the relationship to each attribute. The same behavior occurs for attributes that have been changed.

If the user change or delete any attributes for a relationship, they are displayed similar to other attributes. Attributes for which no changes are made remain unaffected. If a relationship was deleted, no attributes may be shown.

When a DCR is assigned to a user for review, the user may receive an email notification. When a DCR is approved or rejected, the DCR initiator gets an email notification with the approval status, name of the approver, and comments from the person who approved.

The platform 102 may provide the ability to manage a variety of data entities using Hub. A profile is a collection of all the data associated with an entity. Profiles contain the attributes for an entity, relationships for an entity, and sources for all of the attributes. It is possible that an entity attribute can have multiple sources and multiple values. The Operational Value (OV) is the current value for a given attribute, as defined by the survivorship rule for the attribute. The Profile pages enable viewing and managing the details for each entity in a tenant.

In various embodiments, Inbox enables a user to efficiently view, manage, and work on the business tasks assigned to a user or the user's team. The Inbox has filtering capabilities. Also, the user may create a workflow task and take action to review a potential match. As an assignee you can take required actions on a workflow task. The platform 102 provides an easy way to review potential matches from the Search view. Every workflow task can have variables associated with the entire workflow process or specific to a step. These variables usually have internal information that can be used in custom workflows.

The user may want to access Inbox from your mobile devices, such as Smartphones or Tablets. The mobile experience is optimized for smaller form factors with support for gestures.

Inbox: Lists tasks and displays information such as, name of the creator, status of the task, created date, and the due date. The task icon indicates the process the task belongs to. More than one process can be represented in the list, and the processes can be varied with regard to things like approving an expense report, matching tasks, and so on.

Team: Lists tasks assigned to the user's team members. Team members can perform any task, reassign any task, or simply view any task.

Sent: Lists tasks that have been sent for approval.

All: Lists all open and closed tasks. The users who have the necessary permissions will be able to access the closed or resolved tasks. By default, closed tasks will be available in Inbox for a period of one year from the resolved or closed date.

Figure 19:
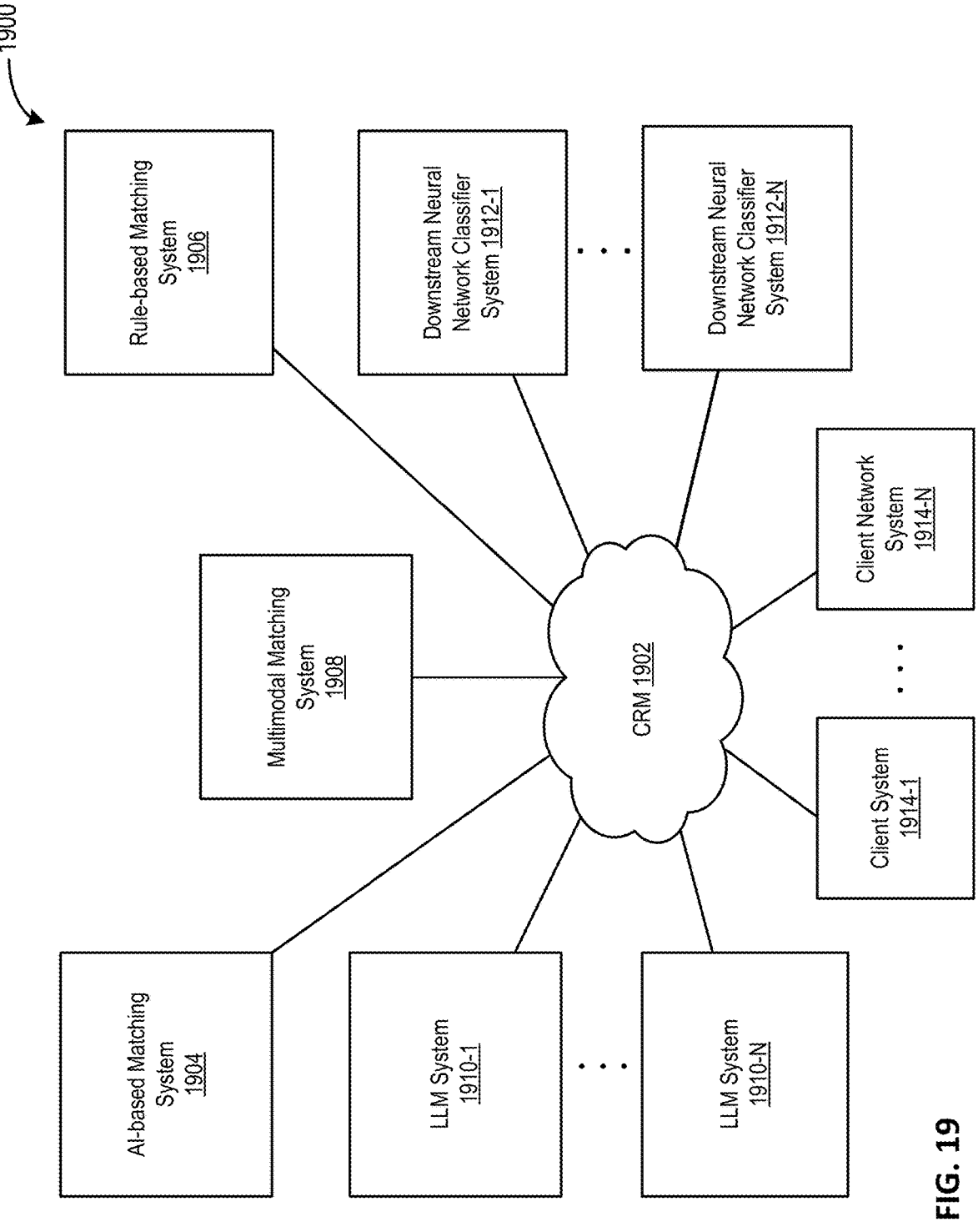
FIG. 19 depicts a diagram of an example flexible entity resolution network system.

FIG. 19 depicts a diagram 1900 of an example multimodal entity resolution network system. In the example of FIG. 19, the multimodal entity resolution network system provides artificial intelligence (AI) based entity resolution (e.g., via flexible entity resolution network system) and rules-based entity resolution. The AI-based entity resolution and the rules-based entity resolution may be performed independently and/or in parallel with each other. In the example of FIG. 19, the multimodal entity resolution network system includes an AI-based matching system 1904, a rules-based matching system 1906 coupled to a computer-readable medium 1902, a multimodal matching system 1908 coupled to a computer-readable medium 1902, large language model systems (individually, the large language model system 1910, collectively, the large language model systems 1910) coupled to the computer-readable medium 1902, downstream neural network classifier systems (individually, the downstream neural network classifier systems 1912, collectively, the downstream neural network classifier systems 1912) coupled to the computer-readable medium 1902, and client systems (individually, the client system 1914, collectively, the client systems 1914) coupled to the computer-readable medium 1902.

The AI-based matching system 1904 can function to determine (e.g., classify) any number of entities as matching (e.g., they are the same entity) or non-matching (e.g., they are different entities) using domain-agnostic large language models and downstream neural network classifiers. Functionality of the AI-based matching system 1904 can be performed by one or more servers and/or other computing devices. In some embodiments, the domain-agnostic large language models and/or downstream neural network classifiers are remote from the AI-based matching system 1904, and the AI-based matching system communicates with the large language model systems 1910 and/or downstream neural network classifier systems 1912 to obtain the functionality of those systems. In other embodiments, they may be part of the same system.

In some embodiments, the AI-based matching system 1904 can identify new kinds (or, types) of matches that would not be possible with other types of machine learning or rules-based entity resolution systems. For example, the AI-based matching system can identify matches on semantic distance on free-form text (e.g., product descriptions), transliteration/international formats, and out-of-box fuzzy performance on attributes when they do not behave well.

Examples of the new kinds of matches that the AI-based matching system 1904 can identify are presented in the table below:

| Feature Type | Example | Example Issue Explanation |
|---|---|---|
| Domain-Specific Semantic Similarity | Prime-Line Hex Lag Screws, ⅝ inch × 3 in. vs. Primeline Hex Lag Bolts, ⅝ by Steel | Lag Bolts and Lag Screws are the same thing. How would another model know this? |
| International Alphabets/ Formats | 山本卞雄 vs Yukio Yamamoto | Not only are the alphabets different, but name ordering in Japanese culture is reversed. |
| Common Fuzzy Match Improvements | Александр Иванов match score: Alexandra Jackson: 15.5% Alexandra Sharapova: 25.5% Alexandra Ivanova: 85.4% Alex Ivanov: 93.5% Alexander Ivanov: 94.0% | As the name transitions from an American female name to a Russian male equivalent in Latin text, the score itself follows a smooth distribution of a well-behaved distance function. |

The rules-based matching system 1906 can function to generate and/or execute match rules to determine whether data records (e.g., data records representing entities) are the same (e.g., a "match") or different (e.g., a "non-match"). In some embodiments, more specifically, the rules-based matching system 1906 can function to determine whether an entity (e.g., a person, organization, product, and/or the like) associated with a data record is also associated with one or more other data records. Accordingly, the rules-based matching system 1906 can execute various match rules on the data records to identify duplicate data records and/or other matching data records. In some embodiments, match rules include comparison formulas that are responsible for comparing data records with each other. In one example, a comparison formula within a match rule may be used to adjudicate a candidate match pair and can evaluate to TRUE or FALSE (or a score if matching is based on relevance).

The multimodal matching system 1908 can function to execute and/or manage a parallelized execution of rules (e.g., match rules) and machine learning models (e.g., match machine learning models, such as domain-agnostic large language models, downstream neural network classifier models, etc.). For example, the multimodal matching system 1908 can manage the AI-based matching system 1904, rules-based matching system 1906, large language model systems 1908, and/or downstream neural network classifier systems 1912, to perform parallel execution of machine learning-based entity resolution and rules-based entity resolution.

The large language model systems 1910 can function to execute domain-agnostic large language models. As used herein, in some embodiments, the domain-agnostic large language models (and/or other machine learning models) can include pretrained models (e.g., incorporating zero-shot learning). Functionality of the large language model systems 1910 can be performed by one or more servers and/or other computing devices. In some embodiments, the large language model systems 1910 are remote from the AI-based matching system 1904, and the AI-based matching system communicates with the large language model systems 1910 to obtain the functionality thereof. In other embodiments, they may be part of the same system.

In some embodiments, the large language model systems 1910 can function to generate and/or execute approximator networks (e.g., approximator network models). The approximator networks can use a large language model (e.g., domain-agnostic large language model) as a labeling tool to a prompt. Using the original strings that were used to create a prompt, and the large language model as the labeling tool, the large language model systems 1910 can create a smaller neural network whose aim is to only replicate the behavior of the large language model on that single question (e.g., without any ability to do anything else).

In some embodiments, the approximator networks are used to emulate the large language model prompts prompt above and is a fully-connected neural network trained with stochastic gradient descent, standard techniques like dropout, momentum, and/or early-stopping. In some embodiments, the approximator networks may require training data. The datasets with the training data, such as names, can use the embeddings as they are, but the embeddings for prompt approximators where there are fewer samples may have their embeddings projected into a smaller dimensional space via PCA.

An example is provided below:
Name 1: Rob Sylvester
Name 2: Robin Michael Sylvester:
Prompt: Are Rob Sylvester and Robin Michael Sylvester the same person. Answer
yes or no?
Large language model (e.g., Flan-T5-XL) label of the above: 0.77

This creates a training example of:

X: ("Rob Sylvester", "Robin Michael Sylvester")

Y: 0.77

If this is done a few thousand times, for example, the system can replace the large language model (e.g., Flan-T5-XL) on that single prompt with this trained model.

This can be done for every prompt, such that the Flan-T5-XL is no longer needed on our inference model and can just rely on a bunch of these smaller approximator networks. Fitting these approximator networks may include a rich combination of linguistic features, other embedding features, and/or the like.

The downstream neural network classifier systems 1912 can function to generate a final result indicating whether entities are the same or different. More specifically, the downstream neural network classifier systems 1912 can combine outputs (e.g., features scores) of one or more domain-agnostic large language models to generate the final result. Functionality of the downstream neural network classifier systems 1912 can be performed by one or more servers and/or other computing devices. In some embodiments, a downstream neural network classifier sits on a head that learns a curve on its own. The downstream neural network classifier can take, for example, four features and fit them into a single number. It can be trained in a matter of seconds and is so small that it is computationally irrelevant (e.g., it runs in under a millisecond on a CPU). However, the performance difference is large. In some embodiments, the AI-based matching system 1904 can normalize the scores before the AI-based matching system 1904 injects them into the downstream neural network classifier for several reasons.

Figure 20:
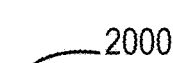
FIG. 20 depicts a diagram of an example AI-based matching system for machine learning-based matching analysis and prediction using generative AI models (e.g., large language models) and downstream neural network classifiers.

FIG. 20 depicts a diagram 2000 of an example AI-based matching system 2002 for machine learning-based matching analysis and prediction using domain-agnostic large language models and downstream neural network classifiers. The AI-based matching system 2002 may be the same as the AI-based matching system 1904. In the example of FIG. 20, the AI-based matching system 2002 includes a parsing engine 2004, a machine learning-based matching engine 2006, a clipping engine 2008, an ML token phrase analysis engine 2010, an ML match analysis engine 2012, an ML match performance recommendation engine 2014, an ML matching configuration and tuning engine 2016, an AI match merging engine 2018, an AI-based matching system interface engine 2020, and an AI-based matching system datastore 2030.

The parsing engine 2004 is intended to represent an engine that can generate prompts for domain-agnostic large language models. More specifically, the parsing engine 2004 can identify attributes in various data models. For example, attributes can include name attributes (e.g., prefix, first name, middle name, last name, suffix) of a name object of an individual entity model. In some embodiments, the parsing engine 2004 identifies the attributes and the data model based on an entity resolution request (e.g., received from a data steward).

In some embodiments, the parsing engine 2004 can function to generate strings based on the attributes. For example, a first string may be a concatenation of a first set of attributes, a second string may be a concatenation of a second set of attributes, and so forth. Each string may represent a particular feature for a domain-agnostic large language model.

In some embodiments, the parsing engine 2004 generates prompts for domain-agnostic large language models based on the created strings. A single feature for a model can be an output of a prompt to a domain-agnostic large language model. The parsing engine 2004 can tune the prompts and provide them the correct strings that are results of parsed JSON objects that represent various features, and the features can be not only accurate but also follow a very smooth distribution.

In some embodiments, the parsing engine 2004 may generate a prompt for a domain-agnostic large language model executed on one or more large language model systems 1910. In one example, the prompt may include:

name_one_prefix="Name 1: Александр Иванов"

name_two_prefix="Name 2: (candidate)"

name_task_suffix="Considering the many nicknames, orders, formats and alphabets used in names of people, are Name 1 and Name 2 referring to the same person? Answer yes or no"

The "candidate" of the prompt may refer to any number of other candidate entities (e.g., 135. Western Union Avenue, Baltimore, Maryland, USA, 21201).

In one example, the another prompt may include:

address_one_prefix="135 W. Union Ave, Baltimore MD, United States, 21201"

address_two_prefix=(candidate)

address_task_suffix="Considering how addresses can be written in many formats, are Address 1 and Address 2 referring to the same location?Answer yes or no:"

The machine learning-based matching engine 2006 is intended to represent an engine that determines, based on one or more match machine learning models, whether any data records match any other data records. For example, the match machine learning models may include domain-agnostic large language models executing on one or more large language model systems 1910 and/or downstream neural network classifier models executing on one or more downstream neural network classifier systems 1914. The machine learning-based matching engine 2006 may cooperate with the AI-based matching system interface engine 2020 in order to communicate with those systems to perform such functionality.

In some implementations, the match machine learning models include domain-agnostic large language models. Domain-agnostic large language models can include large language models that have not been trained on domain-specific datasets, customer-specific datasets, and/or the like, that can identify matches more accurately even when data records have different structures, formats, and/or information. In one example, the machine learning-based matching engine 2006 and/or the large language models can implement one or more similarity algorithms or models to determine matches. In one example, the domain-agnostic large language models can create features measuring distances between two names, addresses, etc., and these features can be reused in any entity model, or even an attribute model about names, addresses, etc. This reusability pattern is different than a single model that consumes all of these representations of name features to output an entity score, because that model is retrained for different entity types, and the interpretability of the features are only local to their original models.

In some embodiments, the machine learning-based matching engine 2006 can swap out one or more large language models (e.g., Flan-T5 XL) with a version of Flan-T5 XL that has been fine-tuned to this specific task (e.g., an approximator network). More specifically, the machine learning-based matching engine 2006 can replace the large language model with a series of neural networks that each approximate the outputs of a large language model (e.g., Flan-T5 XL). These may be referred to as "approximator networks", which are much smaller than the large language model (e.g., $\frac{1}{1000}$th the size of the original large language model). The machine learning-based matching engine 2006 may swap pre-runtime, at or during runtime (e.g., on-the-fly), and/or post-runtime.

In some embodiments, the machine learning-based matching engine 2006 can build approximator network models (or, approximator networks or, simply, approximators) for each of the specific prompts that are used in the large language models. In other words, if there are typically two pieces of text, X and Y, and the machine learning-based matching engine 2006 can inject them into a prompt that will perform a distance measurement between X and Y, and then the large language model output for this pair as a label to a downstream model. This can allow, for example, training a classification head with a small amount of actual data.

EXAMPLE

```
name_one_prefix="Full Name 1: R. Sylvester"
name_two_prefix="Full Name 2: Rob Michael Sylvester"
name_task_suffix="Considering the many nicknames,
    orders, formats and alphabets used
in names of people, . . .
NamePromptHelper=PromptHelper(
x1_prefix=name_one_prefix,
x2_prefix=name_two_prefix,
task_suffix=name_task_suffix
)
```

The large language model normalized output score for this prompt may be 0.76, meaning the model is roughly 76% sure of a yes and 24% sure of a no. But if the system collects many such training examples and makes a training set with them, the machine learning-based matching engine 2006 can train a much smaller and cheaper model that attempts to approximate these outputs, and then train the model heads with this ensemble of approximator networks instead of the large language model head, which reduce computational cost. The machine learning-based matching engine 2006 can switch back to the large language model (e.g., if more accuracy is needed).

In some embodiments, the machine learning-based matching engine 2006 may use sentence transformer outputs (e.g., STSB Multilingual Sentence Transformer outputs) to generate a vectorized representation from the original text strings that can be used as an input layer in the approximator neural network (or, simply, approximator network).

The clipping engine 2008 is intended to represent an engine that can clip (e.g., redact) a portion of a result generated by a domain-agnostic large language model. For example, the clipping engine 2008 may clip results to either a "yes" or "no". More specifically, the clipping engine 2008 can identify the "yes" or "no" in the result, and then remove the remainder of that result. This can, for example, prevent any type of hallucination, and cause the models to execute much faster.

The ML token phrase analysis engine 2010 is intended to represent an engine that determines a quantity and/or quality of determined data record matches. For example, the ML token phrase analysis engine 2010 may determine a quantity of data record matches produced by one or more match machine learning models and cooperate with the machine learning-based matching engine 2006 to determine the quality of those matches. For example, threshold values may indicate whether too many or too few matches are being determined.

The ML match analysis engine 2012 is intended to represent an engine that determines the performance of match machine learning models. In some embodiments, the ML match analysis engine 2012 can analyze match machine learning models in a live multi-tenant production environment.

In some embodiments, the ML match analysis engine 2012 can generate explainability reports that explain how a model result (e.g., domain-agnostic large language model result, approximator network approximator result, machine learning model final result) is determined. Traditionally, methods for explainability in machine learning models tend to cater toward data scientists as an audience, with outputs that are distributions of feature coefficients, a list of eigenvalues, or approximations of feature power sets present in methods like SHAP values. However, that is not helpful to other users (e.g., a data steward). With the systems and methods described here, the prompts themselves are interpretable to a data steward. Each feature may ask for a distance between an attribute or group of attributes, but even these groupings are understood by a human reader. How different are two full names? How different are two street addresses? How different are two product descriptions? These may be exactly the large language model feature outputs. Generally, the higher the feature output, the higher the model output, and this correlation is good enough that the ML match analysis engine 2012 can output to a data steward, along with the final entity score (e.g., machine learning final result), a list of these single large language model prompt outputs as a version of explainability.

In other words, explainability is handled by the machine learning match analysis engine 2012 by considering the individual outputs of the large language model classifiers (e.g., Flan classifiers). For example, FullName: (some score), Address: (some score). The explainability output can map each of these to a single string. This can then be passed to a generative model for increased readability by a user.

The ML match performance recommendation engine 2014 is intended to represent an engine that generates match recommendation actions based on one or more machine learning models and the performances of the associated match machine learning models. For example, the ML match performance recommendation engine 2014 may include one or more machine learning models that use match analysis (e.g., generated by the machine learning-based matching engine 2006) to determine one or more corrective actions to improve the performance of the corresponding match machine learning models. Recommendation actions can include, for example, recommendation to add machine learning models, modify machine learning models, delete machine learning models, and/or the like. The ML match performance recommendation engine 2014 may also generate an explanation describing the reasoning used to determine the corrective actions.

In some embodiments, the ML match performance recommendation engine 2014 can execute and provide recommendations automatically and/or in real-time. For example, the ML match performance recommendation engine 2014 may execute continuously and/or in real-time in a live production environment and generate analysis and flag potentially harmful match machine learning models. The ML match performance recommendation engine 2014 may immediately process those machine learning models and generate corresponding recommendations without any intervention from a user.

In some embodiments, the ML match performance recommendation engine 2014 can function to execute recommendation actions. The ML match performance recommendation engine 2014 may execute recommendation actions based on user input (e.g., received through a graphical user interface generated by the AI-based matching system interface engine 2020) and/or automatically. For example, the ML match performance recommendation engine 2014 may execute, without requiring user input, actions to add machine learning models, modify machine learning models, delete machine learning models, and/or the like.

The ML matching configuration and tuning engine 2016 is intended to represent an engine that configures and/or tunes match machine learning models based on user input and/or automatically (e.g., without requiring user input). For example, the ML matching configuration and tuning engine 2016 may allow a user (e.g., via a graphical user interface generated by the AI-based matching system interface engine 2020) to implement reinforcement learning and/or other techniques that can improve model performance based on user feedback (e.g., user inputs indicating to merge or not merge records determined as a match).

The ML matching configuration and tuning engine 2016 can also function to test different match machine learning model deployment schemes prior to deployment. For example, a user may provide various machine learning models and the ML matching configuration and tuning engine 2016 can simulate how match performance may improve or decrease based on the tested schemes. This can, for example, reduce the computational impact of deploying harmful machine learning models.

In some embodiments, the ML matching configuration and tuning engine 2016 can configure and/or tune match machine learning models based on user inputs received in response to prompts generated by the ML matching configuration and tuning engine 2016. For example, the match rule configuration and tuning engine 1914 may prompt a user with various questions, such as "Is John and Johnny the same person?" and the match rule configuration and tuning engine 1914 can configure and tune one or more match machine learning models based on the response.

The AI match merging engine 2018 is intended to represent an engine that can merge two or more matching data records (e.g., of two or more entities). For example, the AI match merging engine 2018 can merge a first data record with a second data record and maintain the second data record and disregard (e.g., delete, ignore) the first data record in any subsequent operations. In another example, the merging engine 1996 may create a new data record from the first and second data records and disregard the first and second data records in any subsequent operations.

In some embodiments, the AI match merging engine 2018 can function to identify candidate data records for potential match identification. More specifically, the merging engine 1916 may identify various data records (e.g., data records of a live multi-tenant enterprise environment). Each data record may be associated with an entity (e.g., person, organization, enterprise, product), and each data record may include various record fields (e.g., first name, last name, social security number, email address, phone number, city, state, county, zip code, area code, country, organization, and the like) and corresponding record field values (e.g., John, Doe, 555-55-5555, john.doe®domain.com, 555-555-5555, Boston, MA, Suffolk, 02109, 617, USA, Acme, and the like). The AI match merging engine 2018 may identify candidate records that have the same corresponding field values, as well as records that have different values, format, structure, and the like. The candidate records may be used (e.g., the machine learning-based matching engine 2006) to determine matches between data records.

The AI-based matching system interface engine 2020 is intended to represent an engine that can send requests, transmit and receive communications, and/or otherwise provide communication with one or more of the systems, engines, devices and/or datastores described herein. In a specific implementation, the AI-based matching system interface engine 2020 may function to encrypt and decrypt communications. The AI-based matching system interface engine 2020 may function to send requests to and receive data from one or more systems through a network or a portion of a network (e.g., computer-readable medium 102). In a specific implementation, the AI-based matching system interface engine 2020 may send requests and receive data through a connection, all or a portion of which can be a wireless connection. The AI-based matching system interface engine 2020 may request and receive messages, and/or other communications from associated systems and/or engines. Communications may be stored in datastore 230.

In one example, the AI-based matching system interface engine 2020 can communicate with large language models and downstream neural network classifier systems to perform the functionality described herein.

In some embodiments, the AI-based matching system interface engine 2020 can function to present visual, audio, and/or haptic information. In some implementations, the AI-based matching system interface engine 2020 generates graphical user interface components (e.g., server-side graphical user interface components) that can be rendered as complete graphical user interfaces on various systems (e.g., client systems). The AI-based matching system interface engine 2020 can function to present an interactive graphical user interface for display and receiving information.

In some embodiments, the AI-based matching system interface engine 2020 can function to present graphical user interface elements of graphical user interfaces. More specifically, the AI-based matching system interface engine 2020 may generate graphical user interface elements indicating a type of process used to determine a match. For example, one graphical user interface element may indicate that a match was determined using match rules, while another graphical user interface element may indicate that a match was determined using machine learning. This can allow a user to have more confidence when determining whether to merge records. For example, having both indications may increase the likelihood that the data records match.

FIG. 21 depicts a flowchart 2100 of an example method of AI-based flexible entity resolution. In this and other flowcharts, flow diagrams, and/or sequence diagrams, the flowchart illustrates by way of example a sequence of modules. It should be understood that the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2102, an AI-based matching system (e.g., AI-based matching system 2002) receives an entity resolution request. The entity resolution request can indicate a first entity (e.g., "Александр Иванов " with an address of "135

W. Union Ave, Baltimore MD, United States, 21201") and a second entity (e.g., "Dr. Sarah Jackson" with an address of "123 W. Union Avenue, Baltimore, Maryland, United States, 99801"). In some embodiments, an AI-based matching system interface engine (e.g., AI-based matching system interface engine 2020) receives the entity resolution request (e.g., from a client system 1914) over a network (e.g., computer-readable medium 1902). For example, a client system 1904 of a data steward may provide the request to help determine if the entities are the same or different. In some embodiments, the entity resolution request may indicate any number of second entities (e.g., so that the first entity can be compared with any number of other entities). For example, the second entities may include any number of candidate entities.

In module 2104, the AI-based matching system identifies a plurality of first attributes in a data model. For example, the first attributes can include name attributes (e.g., prefix, first name, middle name, last name, suffix) of a name object of an individual entity model. In some embodiments, a parsing engine (e.g., parsing engine 2004) identifies the first attributes and the data model (e.g., based on the entity resolution request).

In module 2106, the AI-based matching system identifies a plurality of second attributes in the data model. For example, the second attributes can include attributes (e.g., addressline1, addressline2, city, etc.) of an address object of the individual entity model. In some embodiments, the parsing engine identifies the second attributes (e.g., based on the entity resolution request).

In module 2108, the AI-based matching system creates a first string based on the plurality of first attributes of the data model. For example, the parsing engine may concatenate the first attributes in order.

In module 2110, the AI-based matching system creates a second string based on the plurality of second attributes of the data model. For example, the parsing engine may concatenate the second attributes in order.

In module 2112, the AI-based matching system generates a first prompt based on the first string. In some embodiments, a machine learning-based matching engine (e.g., machine learning-based matching engine 2006) generates the first prompt. For example, the machine learning-based matching engine may generate the first prompt for a large language model executed on one or more large language model systems (e.g., large language model systems 1910). The large language model systems may be separate from the AI-based matching system. For example, the large language model systems may execute on one or more devices, and AI-based matching system may execute on one or more other remote devices. In one example, the first prompt may include:

name_one_prefix="Name 1: Александр Иванов "
    name_two_prefix="Name 2: (candidate)"
    name_task_suffix="Considering the many nicknames, orders, formats and alphabets used in names of people, are Name 1 and Name 2 referring to the same person?Answer yes or no"

The "candidate" of the prompt may refer to any number of other candidate entities (e.g., 135. Western Union Avenue, Baltimore, Maryland, USA, 21201).

In module 2114, the AI-based matching system generates a second prompt based on the second string. For example, the machine learning-based matching engine may generate the second prompt for the large language model executed on the one or more large language model systems. In one example, the second prompt may include:

address_one_prefix="135 W. Union Ave, Baltimore MD, United States, 21201"
    address_two_prefix=(candidate)
    address_task_suffix="Considering how addresses can be written in many formats, are Address 1 and Address 2 referring to the same location?Answer yes or no:"

In module 2116, the AI-based matching system provides the first prompt to a domain-agnostic large language model. For example, the domain-agnostic large language model may be a Flan-T5 XL model that has not been trained on any domain-specific datasets, customer datasets, or the like. In some embodiments, the AI-based matching system interface engine provides the first prompt to the domain-agnostic large language model.

In module 2118, the large language model system generates, by the domain-agnostic large language model using the first prompt, a first domain-agnostic large language model result. For example, the result may include a natural language result, such as "yes, it is a match . . . " or "no, it is not a match." In some embodiments, result may include features scores (e.g., Full Name: 0.75, Address Line 1 & 2: 0.63), Address City: 0.94, and First Name List: 0.47).

In module 2120, the AI-based matching system clips the first domain-agnostic large language model result. For example, the AI-based matching system may clip the result to either a "yes" or "no". For example, it can identify the yes or no, and remove the remainder of the result. This can, for example, prevent any type of hallucination. In some embodiments, a clipping engine (e.g., clipping engine 2008) clips the result.

In module 2122, the AI-based matching system provides the second prompt to the domain-agnostic large language model. In some embodiments, the AI-based matching system interface engine provides the second prompt to the domain-agnostic large language model.

In module 2124, the AI-based matching system generates, by the domain-agnostic large language model using the second prompt, a second domain-agnostic large language model result. For example, the result may include a natural language result, such as "yes, it is a match . . . " or "no, it is not a match." In some embodiments, result may include features scores (e.g., Full Name: 0.75, Address Line 1 & 2: 0.63), Address City: 0.94, and First Name List: 0.47).

In module 2126, the AI-based matching system clips the second domain-agnostic large language model result. For example, the AI-based matching system may clip the result to either a "yes" or "no". For example, it can identify the yes or no, and remove the remainder of the result. This can, for example, prevent any type of hallucination. In some embodiments, the clipping engine clips the result.

In module 2128, the AI-based matching system generates, by a downstream neural network classifier, a machine learning final result based on the clipped first and second domain-agnostic large language model result. For example, final output may be a score based on the first and second large language model results. In some embodiments, the downstream neural network classifiers may combine the features scores of the first and second large language model results.

In module 2130, the AI-based matching system merges, based on the machine learning final result, the first entity and the second entity. In some embodiments, an AI match merging engine (e.g., AI match merging engine 2018) merges the first and second entity because they are deemed, based on the final result, to be the same entity. For example, a data steward may look at the final result and determine that they are the same entity. In another example, the AI-based matching system may automatically determine they are the same entity (e.g., based on a comparison to a threshold score).

FIG. 22 depicts a flowchart 2200 of an example method of interactive parallelized multimodal matching. In this and other flowcharts, flow diagrams, and/or sequence diagrams, the flowchart illustrates by way of example a sequence of modules. It should be understood that the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2202, a multimodal matching system identifies at least two different data records of a plurality of different data records. Each data record may be associated with a respective entity, and each data record may include a plurality of respective record fields and corresponding record field values. At least a first record field value of a first data record is different from a corresponding first record field value of a second data.

In module 2204, the multimodal matching system determines, based on a plurality of different match rules, whether the respective entity associated with the first data record and the respective entity associated with the second data records comprise a same entity.

In module 2206, the multimodal matching system determines, based on one or more machine learning models and in parallel with the rules-based determination and, whether the respective entity associated with the first data record and the respective entity associated with the second data records comprise the same entity.

In module 2208, the multimodal matching system presents, in response to the rules-based determination indicating the respective entities are the same entity, a first graphical user interface element of a graphical user interface.

In module 2210, the multimodal matching system presents a second graphical user interface element of the graphical user interface indicating whether the machine learning-based determination indicates that the respective entities are the same entity or not the same entity.

In module 2212, the multimodal matching system receives, through the graphical user interface, a user input.

In module 2214, the multimodal matching system merges, based on the user input, the first data record and the second data record.

FIG. 23 depicts a flowchart 2300 of an example method of analyzing match rules and generating machine learning-based match rule recommendation actions. In this and other flowcharts, flow diagrams, and/or sequence diagrams, the flowchart illustrates by way of example a sequence of modules. It should be understood that the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2302, a multimodal matching system identifies one or more match rules of a plurality of different match rules. Each of the match rules can be configured to identify whether at least two different data records of a plurality of different data records (e.g., data records of a big data enterprise environment) are each associated with a same entity (e.g., person, organization, product, and/or the like).

The plurality of different data records may be deployed in a production environment (e.g., live data of a production enterprise environment).

In module 2304, the multimodal matching system executes the one or more match rules on the plurality of different data records.

In module 2306, the multimodal matching system determines a respective performance for each of the one or more match rules.

In module 2308, the multimodal matching system generates, based on one or more machine learning models and the respective performances of the one or more match rules, a match rule recommendation action.

In module 2310, the multimodal matching system executes the match rule recommendation action.

Figure 24:
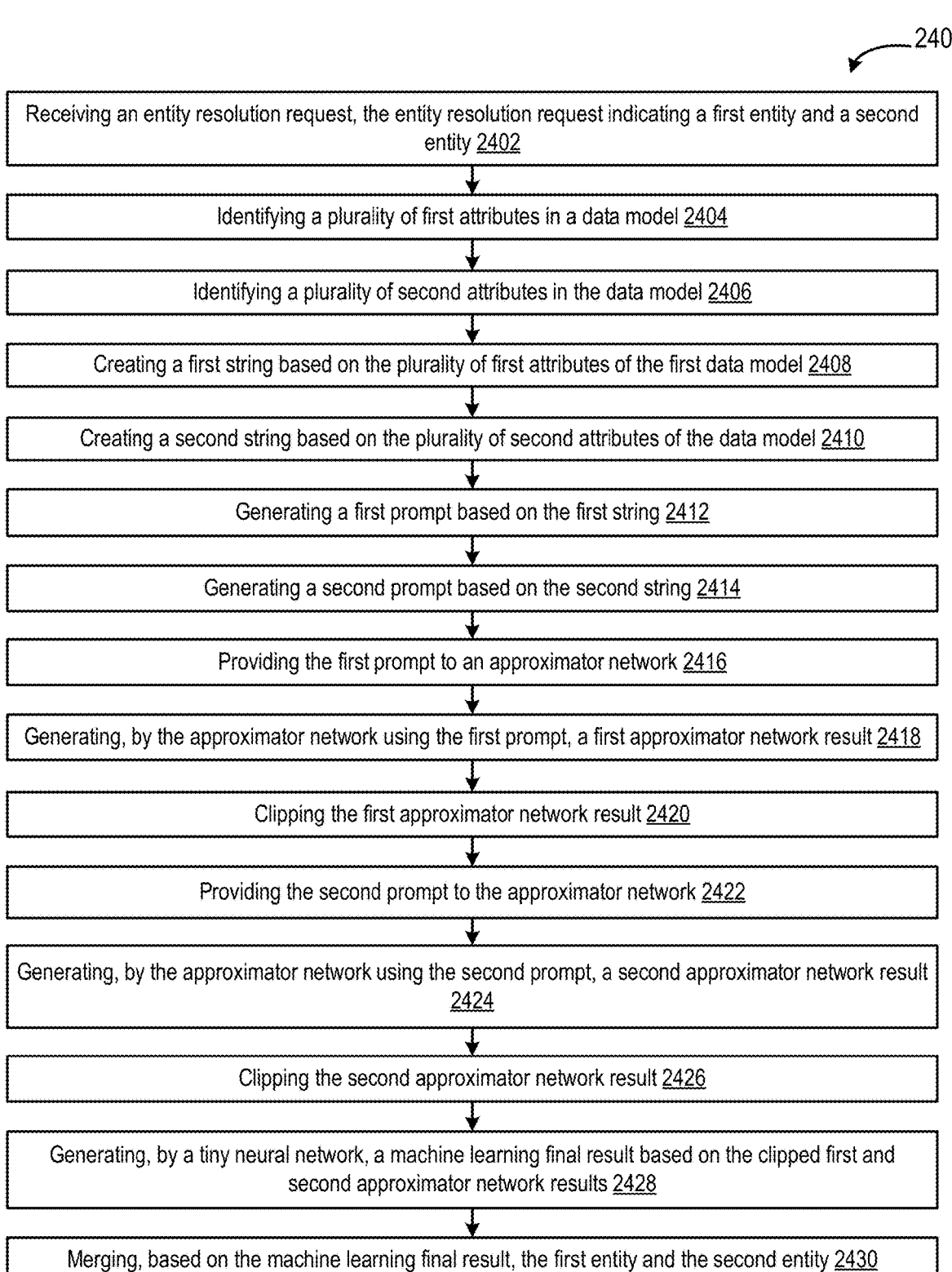
FIG. 24 depicts a flowchart of an example method of AI-based flexible entity resolution using one or more approximator networks.

FIG. 24 depicts a flowchart 2400 of an example method of AI-based flexible entity resolution using one or more approximator networks. In this and other flowcharts, flow diagrams, and/or sequence diagrams, the flowchart illustrates by way of example a sequence of modules. It should be understood that the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2402, an AI-based matching system (e.g., AI-based matching system 2002) receives an entity resolution request. The entity resolution request can indicate a first entity (e.g., "Александр Иванов" with an address of "135 W. Union Ave, Baltimore MD, United States, 21201") and a second entity (e.g., "Dr. Sarah Jackson" with an address of "123 W. Union Avenue, Baltimore, Maryland, United States, 99801"). In some embodiments, an AI-based matching system interface engine (e.g., AI-based matching system interface engine 2020) receives the entity resolution request (e.g., from a client system 1914) over a network (e.g., computer-readable medium 1902). For example, a client system 1904 of a data steward may provide the request to help determine if the entities are the same or different. In some embodiments, the entity resolution request may indicate any number of second entities (e.g., so that the first entity can be compared with any number of other entities). For example, the second entities may include any number of candidate entities.

In module 2404, the AI-based matching system identifies a plurality of first attributes in a data model. For example, the first attributes can include name attributes (e.g., prefix, first name, middle name, last name, suffix) of a name object of an individual entity model. In some embodiments, a parsing engine (e.g., parsing engine 2004) identifies the first attributes and the data model (e.g., based on the entity resolution request).

In module 2406, the AI-based matching system identifies a plurality of second attributes in the data model. For example, the second attributes can include attributes (e.g., addressline1, addressline2, city, etc.) of an address object of the individual entity model. In some embodiments, the parsing engine identifies the second attributes (e.g., based on the entity resolution request).

In module 2408, the AI-based matching system creates a first string based on the plurality of first attributes of the data model. For example, the parsing engine may concatenate the first attributes in order.

In module 2410, the AI-based matching system creates a second string based on the plurality of second attributes of the data model. For example, the parsing engine may concatenate the second attributes in order.

In module 2412, the AI-based matching system generates a first prompt based on the first string. In some embodiments, a machine learning-based matching engine (e.g., machine learning-based matching engine 2006) generates the first prompt. For example, the machine learning-based matching engine may generate the first prompt for a large language model executed on one or more large language model systems (e.g., large language model systems 1910). The large language model systems may be separate from the AI-based matching system. For example, the large language model systems may execute on one or more devices, and AI-based matching system may execute on one or more other remote devices. In one example, the first prompt may include:

name_one_prefix="Name 1: Александр Иванов "
name_two_prefix="Name 2: (candidate)"
name_task_suffix="Considering the many nicknames, orders, formats and alphabets used in names of people, are Name 1 and Name 2 referring to the same person? Answer yes or no"

The "candidate" of the prompt may refer to any number of other candidate entities (e.g., 135 Western Union Avenue, Baltimore, Maryland, USA, 21201).

In module 2414, the AI-based matching system generates a second prompt based on the second string. For example, the machine learning-based matching engine may generate the second prompt for the large language model executed on the one or more large language model systems. In one example, the second prompt may include:

address_one_prefix="135 W. Union Ave,
Baltimore MD, United States, 21201"
address_two_prefix=(candidate)
address_task_suffix="Considering how addresses can be written in many formats, are Address 1 and Address 2 referring to the same location? Answer yes or no:"

In module 2416, the AI-based matching system provides the first prompt to an approximator network (e.g., executed by one or more large language model systems 1910). For example, the approximator network may be a Flan-T5 XL model that has not been trained on any domain-specific datasets, customer datasets, or the like. In some embodiments, the AI-based matching system interface engine provides the first prompt to the approximator network.

In module 2418, the large language model system generates, by the approximator network using the first prompt, a first approximator network result. For example, the result may include a natural language result, such as "yes, it is a match . . . " or "no, it is not a match." In some embodiments, result may include features scores (e.g., Full Name: 0.75, Address Line 1 & 2: 0.63), Address City: 0.94, and First Name List: 0.47).

In module 2420, the AI-based matching system clips the first approximator network result. For example, the AI-based matching system may clip the result to either a "yes" or "no". For example, it can identify the yes or no, and remove the remainder of the result. This can, for example, prevent any type of hallucination. In some embodiments, a clipping engine (e.g., clipping engine 2008) clips the result.

In module 2422, the AI-based matching system provides the second prompt to the approximator network. In some embodiments, the AI-based matching system interface engine provides the second prompt to the approximator network.

In module 2424, the AI-based matching system generates, by the approximator network using the second prompt, a second approximator network result. For example, the result may include a natural language result, such as "yes, it is a match . . . " or "no, it is not a match." In some embodiments, result may include features scores (e.g., Full Name: 0.75, Address Line 1 & 2: 0.63), Address City: 0.94, and First Name List: 0.47).

In module 2426, the AI-based matching system clips the second approximator network result. For example, the AI-based matching system may clip the result to either a "yes" or "no". For example, it can identify the yes or no, and remove the remainder of the result. This can, for example, prevent any type of hallucination. In some embodiments, the clipping engine clips the result.

In module 2428, the AI-based matching system generates, by a downstream neural network classifier, a machine learning final result based on the clipped first and second approximator network results. For example, final output may be a score based on the first and second large language model results. In some embodiments, the downstream neural network classifiers may combine the features scores of the first and second large language model results.

In module 2430, the AI-based matching system merges, based on the machine learning final result, the first entity and the second entity. In some embodiments, an AI match merging engine (e.g., AI match merging engine 2018) merges the first and second entity because they are deemed, based on the final result, to be the same entity. For example, a data steward may look at the final result and determine that they are the same entity. In another example, the AI-based matching system may automatically determine they are the same entity (e.g., based on a comparison to a threshold score).

What is claimed is:

1. A system comprising:

one or more processors; and memory storing instructions that, when executed by the one or more processors, cause the system to perform:

receiving a plurality of different machine learning models;

testing each of the plurality of different machine learning models, the testing including simulating a respective match performance of each of the plurality of different machine learning models;

selecting, based on the testing and the simulating, a domain-agnostic large language model of the plurality of different machine learning models;

receiving an entity resolution request, the entity resolution request indicating a first entity and a second entity;

identifying a plurality of first attributes in a data model;

identifying a plurality of second attributes in the data model;

creating a first string based on the plurality of first attributes in the data model;

creating a second string based on the plurality of second attributes in the data model;

generating a first prompt based on the first string;

generating a second prompt based on the second string;

providing the first prompt to the domain-agnostic large language model;

generating, by the domain-agnostic large language model using the first prompt, a first domain-agnostic large language model result;

clipping the first domain-agnostic large language model result;

providing the second prompt to the domain-agnostic large language model;

generating, by the domain-agnostic large language model using the second prompt, a second domain-agnostic large language model result;

clipping the second domain-agnostic large language model result;

generating, by a downstream neural network classifier, a machine learning final result based on the clipped first and second domain-agnostic large language model results;

merging, based on the machine learning final result, the first entity and the second entity.

2. The system of claim 1, wherein the plurality of different machine learning models are received from a user.

3. The system of claim 1, wherein the instructions, when executed by the one or more processors, cause the system to perform tuning the domain-agnostic large language model based on user feedback received through a graphical user interface.

4. A method comprising:

receiving a plurality of different machine learning models;

testing each of the plurality of different machine learning models, the testing including simulating a respective match performance of each of the plurality of different machine learning models;

selecting, based on the testing and the simulating, a domain-agnostic large language model of the plurality of different machine learning models;

receiving an entity resolution request, the entity resolution request indicating a first entity and a second entity;

identifying a plurality of first attributes in a data model;

identifying a plurality of second attributes in the data model;

creating a first string based on the plurality of first attributes in the data model;

creating a second string based on the plurality of second attributes in the data model;

generating a first prompt based on the first string;

generating a second prompt based on the second string;

providing the first prompt to the domain-agnostic large language model;

generating, by the domain-agnostic large language model using the first prompt, a first domain-agnostic large language model result;

clipping the first domain-agnostic large language model result;

providing the second prompt to the domain-agnostic large language model;

generating, by the domain-agnostic large language model using the second prompt, a second domain-agnostic large language model result;

clipping the second domain-agnostic large language model result;

generating, by a downstream neural network classifier, a machine learning final result based on the clipped first and second domain-agnostic large language model results;

merging, based on the machine learning final result, the first entity and the second entity.

5. The method of claim 4, wherein the plurality of different machine learning models are received from a user.

6. A system comprising:

one or more processors; and memory storing instructions that, when executed by the one or more processors, cause the system to perform:

receiving a plurality of different machine learning models;

testing each of the plurality of different machine learning models, the testing including simulating a respective match performance of each of the plurality of different machine learning models;

selecting, based on the testing and the simulating, a domain-agnostic large language model of the plurality of different machine learning models;

swapping the domain-agnostic large language model with an approximator network, wherein the approximator network approximates outputs of the domain-agnostic large language model;

receiving an entity resolution request, the entity resolution request indicating a first entity and a second entity;

identifying a plurality of first attributes in a data model;

identifying a plurality of second attributes in the data model;

creating a first string based on the plurality of first attributes in the data model;

creating a second string based on the plurality of second attributes in the data model;

generating a first prompt based on the first string;

generating a second prompt based on the second string;

providing the first prompt to the approximator network;

generating, by the approximator network using the first prompt, a first approximator network result;

clipping the first approximator network result;

providing the second prompt to another approximator network;

generating, by the other approximator network using the second prompt, a second approximator network result;

clipping the second approximator network result;

generating, by a downstream neural network classifier, a machine learning final result based on the clipped first and second approximator network results;

merging, based on the machine learning final result, the first entity and the second entity.

7. The system of claim 6, wherein the plurality of different machine learning models are received from a user.

8. The system of claim 6, wherein the swapping is performed pre-runtime.

9. The system of claim 6, wherein the swapping is performed during runtime.

10. The system of claim 6, wherein the swapping is performed post-runtime.

11. The system of claim 6, wherein the approximator network is smaller than the domain-agnostic large language model.

12. A method comprising:

receiving a plurality of different machine learning models;

testing each of the plurality of different machine learning models, the testing including simulating a respective match performance of each of the plurality of different machine learning models;

selecting, based on the testing and the simulating, a domain-agnostic large language model of the plurality of different machine learning models;

swapping the domain-agnostic large language model with an approximator network, wherein the approximator network approximates outputs of the domain-agnostic large language model;

receiving an entity resolution request, the entity resolution request indicating a first entity and a second entity;

identifying a plurality of first attributes in a data model;

identifying a plurality of second attributes in the data model;

creating a first string based on the plurality of first attributes in the data model;

creating a second string based on the plurality of second attributes in the data model;

generating a first prompt based on the first string;

generating a second prompt based on the second string;

providing the first prompt to the approximator network;

generating, by the approximator network using the first prompt, a first approximator network result;

clipping the first approximator network result;

providing the second prompt to another approximator network;

generating, by the other approximator network using the second prompt, a second approximator network result;

clipping the second approximator network result;

generating, by a downstream neural network classifier, a machine learning final result based on the clipped first and second approximator network results;

merging, based on the machine learning final result, the first entity and the second entity.

13. The method of claim 12, wherein the plurality of different machine learning models are received from a user.

14. The method of claim 12, wherein the swapping is performed pre-runtime.

15. The method of claim 12, wherein the swapping is performed during runtime.

16. The method of claim 12, wherein the swapping is performed post-runtime.

17. The method of claim 12, wherein the approximator network is smaller than the domain-agnostic large language model.

\* \* \* \* \*